United States Patent
Dorrance et al.

(10) Patent No.: US 9,967,820 B2
(45) Date of Patent: May 8, 2018

(54) WAKE UP RADIO DEVICE, CIRCUIT CONFIGURATION, AND METHOD

(71) Applicant: Intel Corporation, Santa Clara, CA (US)

(72) Inventors: Richard Dorrance, Portland, OR (US); Minyoung Park, Portland, OR (US); Alexander W. Min, Portland, OR (US); Farhana Sheikh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days. days.

(21) Appl. No.: 15/196,070

(22) Filed: Jun. 29, 2016

(65) Prior Publication Data

US 2018/0007629 A1    Jan. 4, 2018

(51) Int. Cl.
| H04W 72/04 | (2009.01) |
| H04W 52/02 | (2009.01) |
| H04L 29/06 | (2006.01) |

(52) U.S. Cl.
CPC ......... *H04W 52/0229* (2013.01); *H04L 69/22* (2013.01)

(58) Field of Classification Search
CPC ....... H04W 4/02; H04W 4/046; H04W 4/023; H04W 72/0433; H04W 48/16;
(Continued)

(56) References Cited

U.S. PATENT DOCUMENTS

| 7,155,263 B1 | 12/2006 | Bergamo |
| 2002/0071477 A1* | 6/2002 | Orava ............... H04L 7/042 |
| | | 375/132 |

(Continued)

FOREIGN PATENT DOCUMENTS

EP    2464175 A2    6/2012

OTHER PUBLICATIONS

Xiongchuan Huang et al., "A 780-950 MHz, 64-146 µW Power-Scalable Synchronized-Switching OOK Receiver for Wireless Event-Driven Applications", IEEE Journal of Solid-State Circuits, May 2014, pp. 1135-1147, vol. 49, No. 5.

(Continued)

*Primary Examiner* — Thanh Le
(74) *Attorney, Agent, or Firm* — Viering, Jentschurpa & Partner mbB

(57) ABSTRACT

According to the present disclosure, a communication device configured to power on a main receiver to receive data from a network includes: a low power receiver configured to receive a wake up packet, including a preamble, from the network and oversample the wake up packet; a circuit arrangement including: a correlator configured to correlate the oversampled portion of the preamble; a delay and adder configured to take an output of the correlator, delay the output of the correlator, and add the output of the correlator back onto itself to produce a delay output; a peak detector configured to detect a peak pattern in the delay output; a demodulator configured to calculate a decoding threshold value to produce a demodulated data; and a packet parser configured to check the demodulated data for a data set in order to selectively output a nonzero signal to power on the main receiver.

15 Claims, 17 Drawing Sheets

(58) Field of Classification Search
CPC ...... H04W 12/08; H04W 88/02; H04L 7/042; H04L 5/0055; H04L 63/166; H04L 63/10
See application file for complete search history.

(56) References Cited

U.S. PATENT DOCUMENTS

2014/0211678 A1    7/2014  Jafarian et al.
2017/0142067 A9*   5/2017  Pietrowicz ............ H04W 12/08

OTHER PUBLICATIONS

The Extended European Search Report based on Application No. 17174386.7 (11 Pages) dated Jul. 31, 2017 (Reference Purpose Only).

* cited by examiner

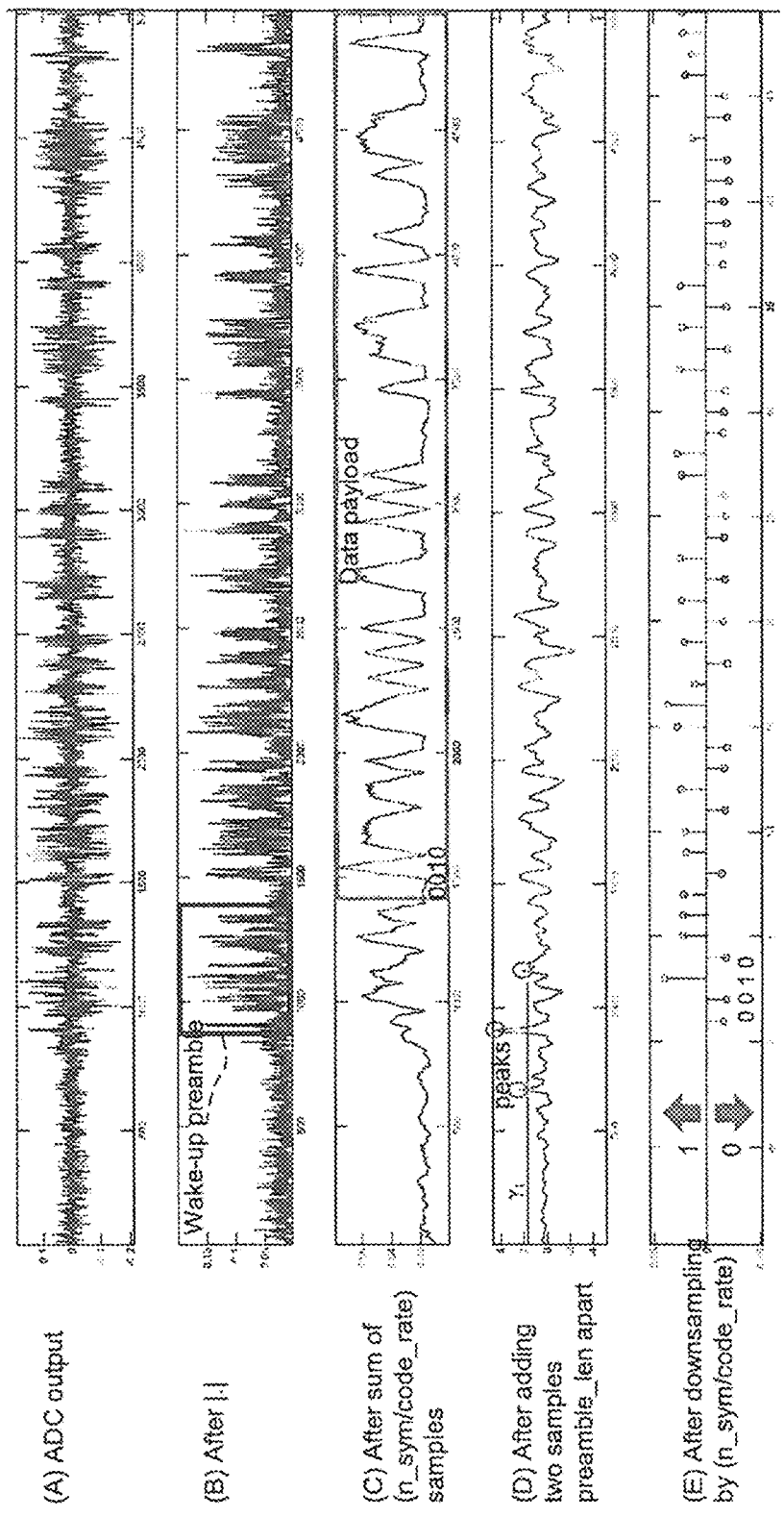

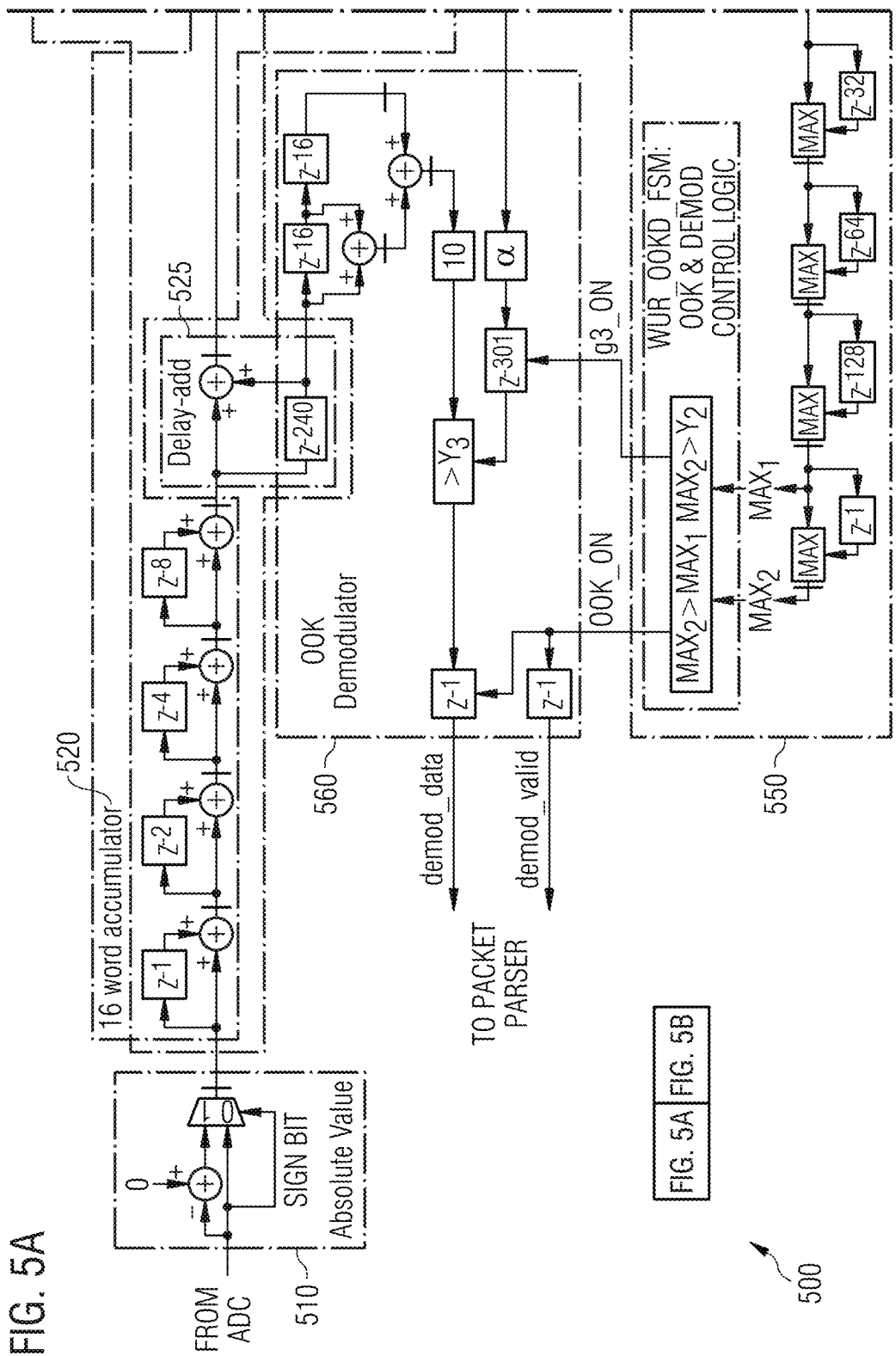

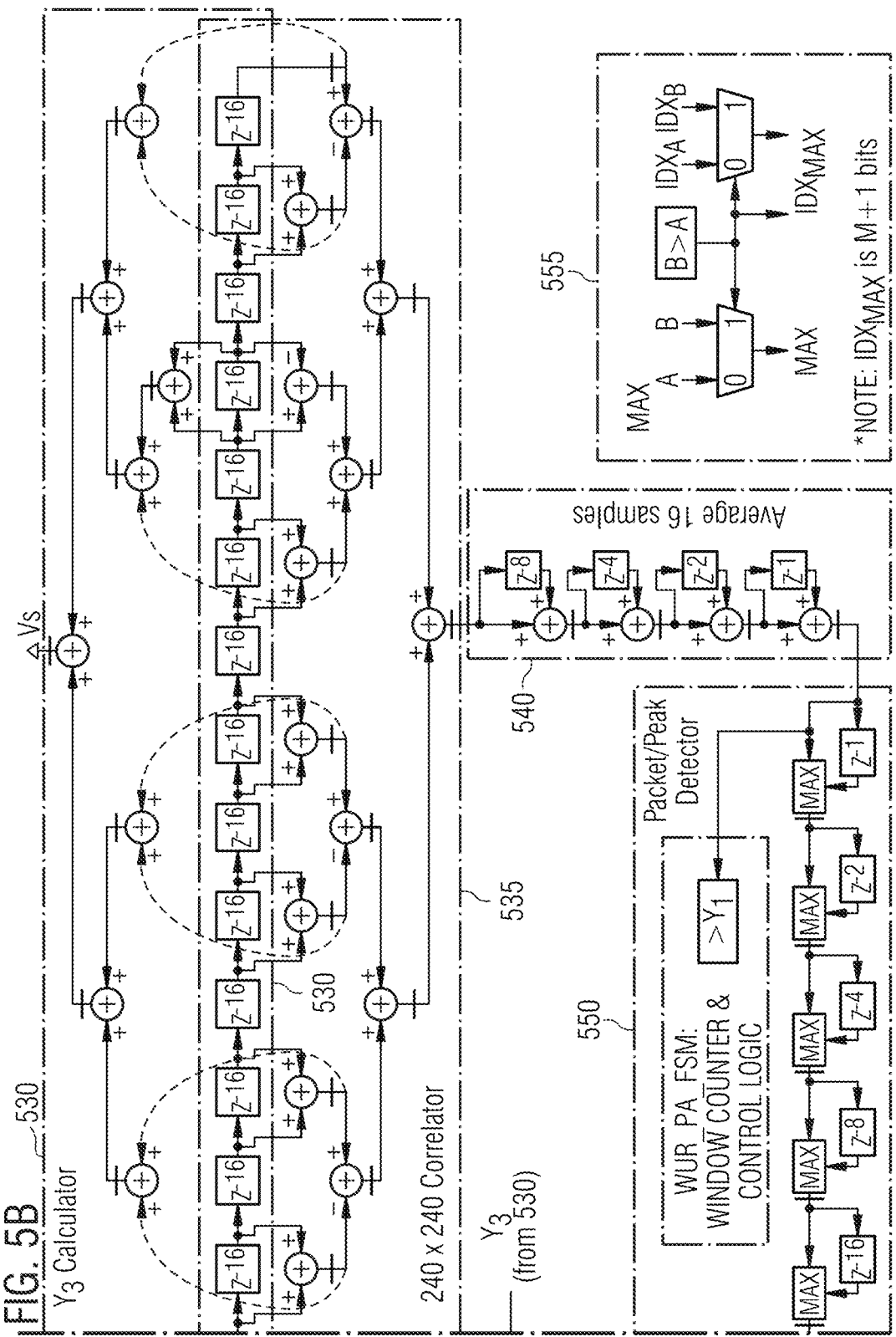

FIG. 6
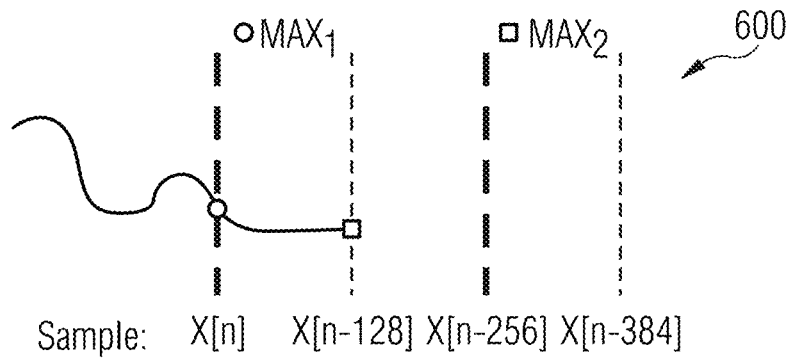
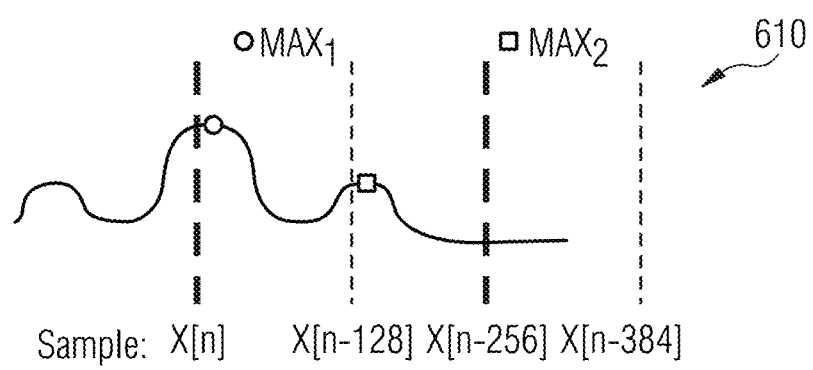
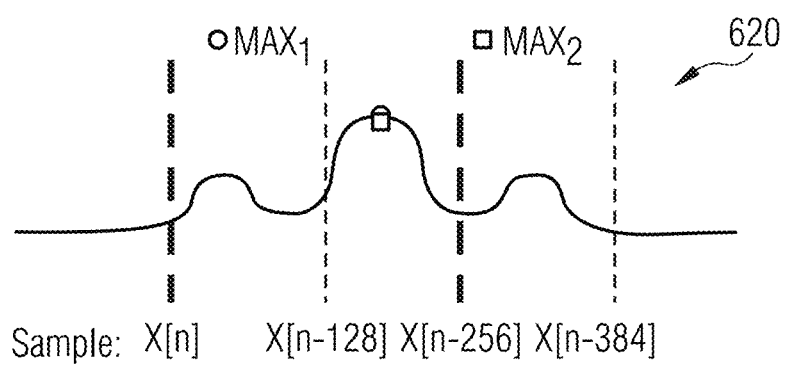
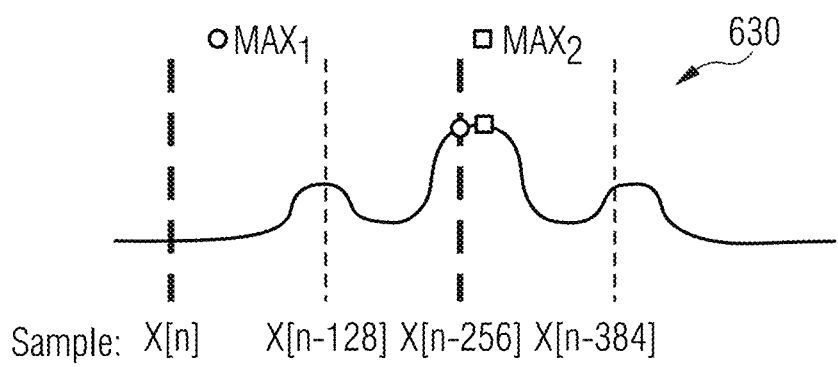

1002 — Coding a wake up preamble portion of the wake up packet, wherein the wake up preamble comprises a repeated pseudorandom noise (PN) sequence 1004 — Coding a data portion of the wake up packet, wherein the data portion comprises a receiver ID, a payload, and a frame check sequence 1006 — Transmitting the wake up packet to the second device

WAKE UP RADIO DEVICE, CIRCUIT CONFIGURATION, AND METHOD

TECHNICAL FIELD

Various aspects of this disclosure relate generally to a method and a device for mobile communications.

BACKGROUND

Low-Power Wake-Up Radio (LP-WUR) breaks the trade-off between low power and availability currently realized by traditional radios. In order to conserve power, traditional radios are duty-cycled and periodically woken up to listen for data transmissions. However, this implementation is not without its drawbacks. If the sleep period is too long, data transmissions may be missed. If the sleep period is too short, then power is not efficiently saved. The ideal sleep period varies from case to case and is difficult to determine even during use-time. Ultimately, the sleep period length is set by an acceptable level of packet loss due to packets being missed during the sleep cycle.

With a LP-WUR, the main (i.e. traditional) radio can be powered off until a wake-up signal is detected by a low power wake up receiver. This wake up receiver is a separate unit to the device in addition to the main radio whose task is to wake up the main radio (i.e. the main receiver) when there is a request for a communication from another component of a wireless network. Since the more power intensive main receiver is only activated during data transfer and does not have to constantly monitor the wireless communication channels, power is saved and data packet loss is minimalized when compared to the traditional duty-cycled implementations.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects of the disclosure are described with reference to the following drawings, in which:

FIG. 4 shows a series of graphs, (A)-(E), of the signals shown at corresponding points (A)-(E) in FIG. 2.

FIG. 5A-5B show a block diagram of the hardware realization in an aspect of this disclosure.

FIG. 6 shows an example of the peak detection method employed in an aspect of this disclosure.

FIG. 10 shows a flow chart in an aspect of this disclosure.

DESCRIPTION

Figure 1:
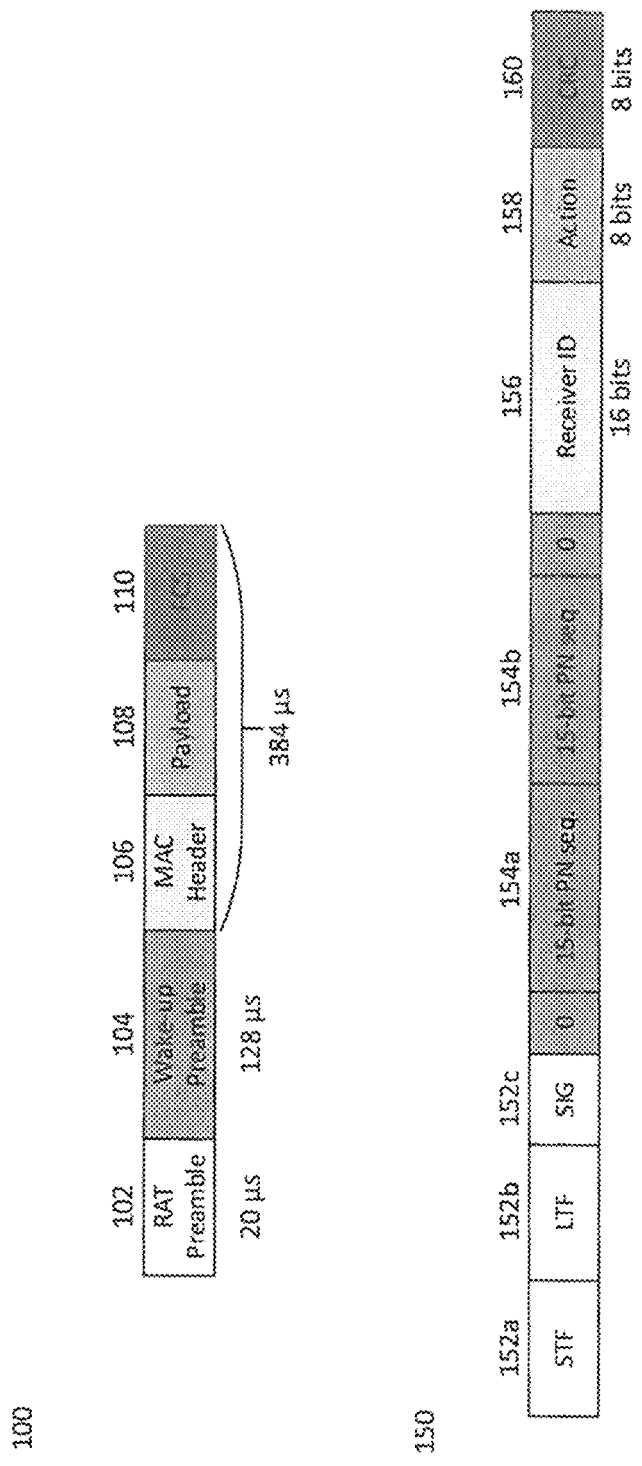
FIG. 1 shows a wake up packet structure in an aspect of this disclosure.

The following detailed description refers to the accompanying drawings that show, by way of illustration, specific details and aspects of the disclosure which may be practiced.

The word "exemplary" is used herein to mean "serving as an example, instance, or illustration". Any embodiment or design described herein as "exemplary" is not necessarily to be construed as preferred or advantageous over other embodiments or designs.

The words "plural" and "multiple" in the description and the claims, if any, are used to expressly refer to a quantity greater than one. Accordingly, any phrases explicitly invoking the aforementioned words (e.g. "a plurality of [objects]", "multiple [objects]") referring to a quantity of objects is intended to expressly refer more than one of the said objects. The terms "group", "set", "collection", "series", "sequence", "grouping", "selection", etc., and the like in the description and in the claims, if any, are used to refer to a quantity equal to or greater than one, i.e. one or more. Accordingly, the phrases "a group of [objects]", "a set of [objects]", "a collection of [objects]", "a series of [objects]", "a sequence of [objects]", "a grouping of [objects]", "a selection of [objects]", "[object] group", "[object] set", "[object] collection", "[object] series", "[object] sequence", "[object] grouping", "[object] selection", etc., used herein in relation to a quantity of objects is intended to refer to a quantity of one or more of said objects. It is appreciated that unless directly referred to with an explicitly stated plural quantity (e.g. "two [objects]" "three of the [objects]", "ten or more [objects]", "at least four [objects]", etc.) or express use of the words "plural", "multiple", or similar phrases, references to quantities of objects are intended to refer to one or more of said objects.

As used herein, a "circuit" may be understood as any kind of logic (analog or digital) implementing entity, which may be special purpose circuitry or a processor executing software stored in a memory, firmware, hardware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It is understood that any two (or more) of the described circuits may be combined into a single circuit with substantially equivalent functionality, and conversely that any single described circuit may be distributed into two (or more) separate circuits with substantially equivalent functionality. In particular with respect to the use of "circuitry" in the claims included herein, the use of "circuit" may be understood as collectively referring to two or more circuits.

A "processing circuit" (or equivalently "processing circuitry" or "processor") as used herein is understood as referring to any circuit that performs an operation(s) on signal(s), such as e.g. any circuit that performs processing on an electrical signal or an optical signal. A processing circuit may thus refer to any analog or digital circuitry that alters a characteristic or property of an electrical or optical signal, which may include analog and/or digital data. A processing circuit may thus refer to an analog circuit (explicitly referred to as "analog processing circuit(ry)"), digital circuit (explicitly referred to as "digital processing circuit(ry)"), logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Accordingly, a processing circuit may refer to a circuit that performs processing on an electrical or optical signal as hardware or as software, such as software executed on hardware (e.g. a processor or microprocessor). As utilized herein, "digital processing circuit(ry)" may refer to a circuit implemented using digital logic that performs processing on a signal, e.g. an electrical or optical signal, which may include logic circuit(s), processor(s), scalar processor(s), vector processor(s), microprocessor(s), controller(s), microcontroller(s), Central Processing Unit(s) (CPU), Graphics Processing Unit(s) (GPU), Digital Signal Processor(s) (DSP), Field Programmable Gate Array(s) (FPGA), integrated circuit(s), Application Specific Integrated Circuit(s) (ASIC), or any combination thereof. Furthermore, it is understood that a single a processing circuit may be equivalently split into two separate processing circuits, and conversely that two separate processing circuits may be combined into a single equivalent processing circuit.

As used herein, "memory" may be understood as an electrical component in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the "term" memory. It is appreciated that a single component referred to as "memory" or "a memory" may be composed of more than one different type of memory, and thus may refer to a collective component comprising one or more types of memory. It is readily understood that any single memory "component" may be distributed or/separated multiple substantially equivalent memory components, and vice versa. Furthermore, it is appreciated that while "memory" may be depicted, such as in the drawings, as separate from one or more other components, it is understood that memory may be integrated within another component, such as on a common integrated chip.

As used herein, a "cell", in the context of telecommunications, may be understood as a sector served by an interface between a communication device and a network, e.g. wireless router, another communication device, base station, etc. Accordingly, a cell may be a set of geographically co-located antennas that correspond to a particular sector of a base station. A base station may thus serve one or more "cells" (or "sectors"), where each cell is characterized by a distinct communication channel, e.g. frequency. There can be multiple cells on a single frequency. A "serving cell" may be understood as a "cell" that a mobile terminal, i.e. communication device, is currently connected to according to the mobile communications protocols of the associated mobile communications network standard. Furthermore, the term "cell" may be utilized to refer to any of a macrocell, microcell, picocell, or femtocell, etc.

The term "base station", used in reference to an access point of a mobile communications network, may be understood as a macro-base station, micro-base station, Node B, evolved Node B (eNodeB, eNB), Home eNodeB, Remote Radio Head (RRH), or relay point, etc.

It is appreciated that the ensuing description may detail exemplary scenarios involving a device operating according to Wifi specifications. It is understood that such exemplary scenarios are demonstrative in nature, and accordingly may be similarly applied to other mobile communication technologies and standards, such as Bluetooth, Near Field Communication (NFC) Long Term Evolution (LTE) and Long Term Evolution-Advanced (LTE-A), WLAN (wireless local area network), UMTS (Universal Mobile Telecommunications System), GSM (Global System for Mobile Communications), CDMA (Code Division Multiple Access), Wideband CDMA (W-CDMA), etc. The examples provided herein are thus understood as being applicable to various other mobile communication technologies, both existing and not yet formulated, particularly in cases where such mobile communication technologies share similar features as disclosed regarding the following examples.

The term "network" as utilized herein, e.g. in reference to a communication network such as a mobile communication network, is intended to encompass both an access component of a network (e.g. a radio access network (RAN) component) and a core component of a network (e.g. a core network component)

The disclosure described herein presents a compact and efficient implementation of LP-WUR baseband in a 14 nm complementary metal-oxide semiconductor (CMOS) where both error detection and error correction are implemented in the wake-up packet/signal. As a result, the baseband disclosed herein is able to minimize system latency by using a single correlator to perform packet synchronization, determine windowed maximums and detect peaks by efficiently utilizing hardware to limit power and area overheads.

The LP-WUR circuit implementations and techniques in this disclosure achieve a leakage power of less than 2 µW for an area of approximately 15,000 $\mu m^2$ in 14 nm CMOS. Simulation results shows that the LP-WUR digital baseband disclosed herein can achieve a packet error ratio (PER) of about 10%, or a bit error rate (BER) of about 0.2% at −82 dBm, for a total system power of 7.1 µW and 12.5 µW at 30° C. and 70° C., respectively.

As part of this disclosure, the LP-WUR baseband circuit implementation uses a repeated 15-bit pseudo-noise (PN) sequence to identify the start of a received packet for both synchronization and to dynamically determine the optimal decoding threshold for the modulated, e.g. on-off key (OOK), data packet. So, in addition to signaling the wake-up packet, the PN sequences also set the decoding threshold. If the receiving device is closer to the transmitting device, e.g. the wireless router, a base station, etc., the threshold will be higher due to the higher power levels. Similarly, if the receiving device is farther from the transmitting device, i.e. near the outer limits of the cell, the threshold will be lower due to the increased distance between the receiving and transmitting devices.

Furthermore, the data packet detection and the decoding are merged to use greater than 99% of the same hardware to concurrently perform both operations. This is achieved by carefully folding the computations of the accumulator in the correlator with the accumulator in the threshold calculation to produce a folded, pipelined, binary tree accumulator with a theoretical minimum number of adders. The baseband described herein implements a novel windowed maximum search algorithm to find the maximum peak correlation as part of the packet synchronization operation in an iterative fashion via a pipelined binary tree search in order to perform the optimally minimum number of comparisons.

An aspect of this disclosure implements a wake-up packet structure with a preamble, receiver ID, payload, and a frame check sequence (FCS) (e.g. a cyclic redundancy check, CRC), wherein the receiver ID, payload, and FCS are repeated three times, i.e. coded at a 1-to-3 rate. The frame structure disclosed herein facilitates the synchronization and decoding calculations performed at the receiving unit.

The preamble disclosed herein comprises a repeated 15-bit PN sequence resulting in more robust synchronization, enabling packet synchronization with a single correlator while minimizing system latency. After the two correlated repetitions are added to each other, the peak detection disclosed herein provides for improved packet detection capabilities when compared to currently implemented schemes. Furthermore, the detection capabilities can be further improved by using an Error Correcting Code (ECC) instead of CRC. The windowed maximum detection method and circuit implementation described herein further boosts the packet detection capabilities of this disclosure.

The baseband circuitry in this disclosure further uses the repeated 15-bit PN sequence from the preamble to provide the optimal decoding threshold, i.e. only one prior wake up radio (WUR) transmitted signal is needed to calibrate the decoding threshold. Current methods use a separate signal from the synchronization signal which is not a PN sequence, resulting in 40-50 dBm less sensitivity. As disclosed herein, the baseband circuitry uses the PN sequence for both detection and synchronization and also to calibrate and set the ideal decoding (e.g. OOK) threshold. By using the disclosed frame structure, the baseband circuitry may be structured to employ a linear algorithm so that the hardware accelerator can reuse 99% or greater of the circuits for synchronization and detection to calculate the threshold. This 99% plus hardware enables a compact design of about 15,000 $\mu m^2$ in a 14 nm CMOS for a total system power of 7.1 μW and 12.5 μW at 30° C. and 70° C., respectively. These values represent approximately a ten times improvement over current methods.

FIG. 1 shows a packet structure 100 in an aspect of this disclosure. Furthermore, packet structure 150 is provided to show packet structure 100 in more detail. It is appreciated that packet structures 100 and 150 are exemplary in nature and may therefore be simplified for purposes of this explanation.

Packet structure 100 shows the main components of the wake-up radio frame structure. The first component is the radio access technology (RAT) specific preamble 102 which informs if the main radio (i.e. the main receiving component) is already woken up, in which case the rest of the wake-up packet can be ignored/discarded. For example, an 802.11 preamble associated with the Media Access Control (MAC) layer of wireless local area networks (WLAN), e.g. Wifi, may be implemented. Other RAT specific preambles may be inserted as well, e.g. for Bluetooth, LTE, or the like. The RAT-specific preamble 102 in this example has a 20 μs duration and is followed by the wake-up preamble 104, which has a duration of 128 μs in frame structure 100. The coding in the wake-up preamble 104 is done at a 1-to-1 ratio, i.e., there is no redundancy. Following the wake-up preamble 104 are the MAC header 106, the payload 108, and the frame check sequence (FCS) 110, all of which are coded at a 1-to-3 ratio, resulting in a combined duration of 384 μs. As a result, the total length of the wake-up packet as shown in 100 is 532 μs (32 bits×4 μs×3 repetitions).

Each component of frame structure is described more in detail in the ensuing explanation for frame structure 150.

The RAT specific Preamble 102 from frame structure 100 is shown with more detail in frame structure 150 as an 802.11 preamble. The short training field (STF) 152a is used for start-of-packet detection, automatic gain control (AGC) setting, initial frequency offset estimation, and initial time synchronization. The long training field (LTF) 152b is used for accurate frequency offset estimation, time synchronization, and channel estimation. The signal field (SIG) 152c contains rate and length information of the packet.

The Wake-up Preamble 104 from frame structure 100 is shown more in detail in frame structure 150 with components 154a-154b, along with the zero bits padded on each end. The Wake-Up Preamble uses a 15-bit pseudo-random noise (PN) sequence, e.g. (1000 1111 0101 100) in 154a which is repeated in 154b, and along with the padded zeros on each end, totals 32 bits.

The MAC header 106 contains the receiver ID 156, which is at least a partial MAC address containing a unique identifier assigned to the specific device and is 16 bits. The payload 108 contains a non-zero action field 158 which generates a wake-up signal and provides any necessary mode configuration information to the main radio unit.

The FCS 110 may be a cyclic redundancy check (CRC) 160 totaling 8 bits. So, the receiver ID 156, the action field 158, and the CRC 160, would total 32 bits which are coded at a 1-to-3 rate, i.e. '1'=[111], '0'=[000].

Figure 2:
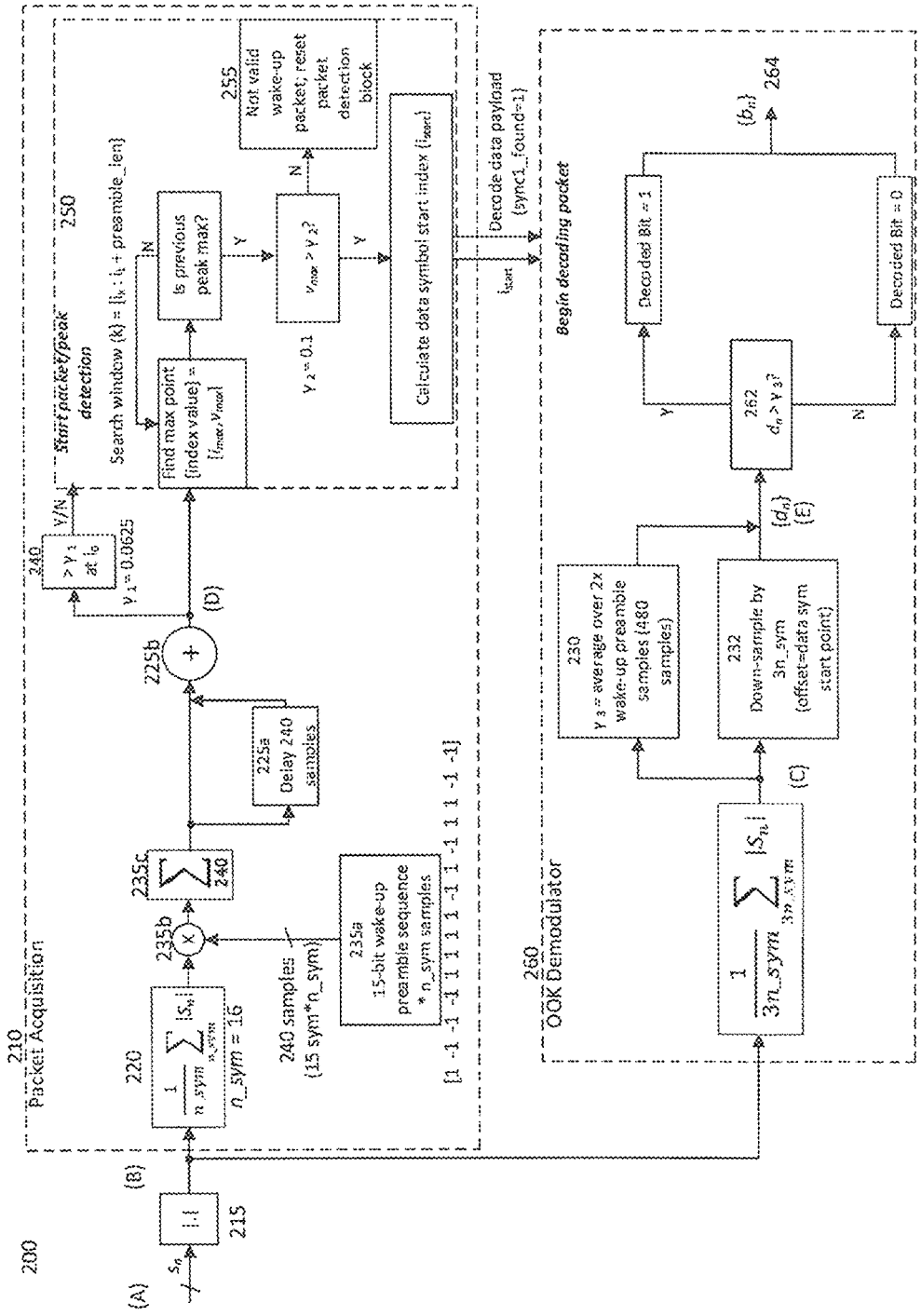
FIG. 2 shows a high level block diagram of the packet acquisition and demodulation in an aspect of this disclosure

FIG. 2 shows a high-level block diagram 200 of the LP-WUR packet acquisition and demodulation system-level blocks. It is appreciated that block diagram 200 is exemplary in nature and may therefore be simplified for purposes of this explanation.

At different points throughout high-level black diagram 200, the signals are labeled with letters (A)-(E). These labels correspond with the similarly labeled graphs in FIG. 4.

High-level block diagram is split into two main blocks, the Packet Acquisition 210 block and the OOK Demodulator 260 block. Packet Acquisition 210 further contains Packet/Peak detection block 250.

First, the absolute value 215 of the output from the analog to digital converter (ADC) of the analog front end (AFE) (demonstrated by (A)) is determined, resulting in data (B). If the AFE uses envelope detection, then this step is unnecessary. While either method may be implemented in an aspect of this disclosure, it would be more energy efficient to perform this step in the digital domain rather than the analog domain, i.e. using the envelope detector.

The ADC oversamples the received signal 16 times, producing 16 samples per transmitted bit. The incoming samples are averaged over 16 samples 220 to attenuate the noise, then put through a 240-bit correlator (the 15-bit PN sequence×16 samples per symbol) 235a-235c. The output of the correlator is delayed 240 cycles 225a and added back on itself 225b, producing data (D), which contains three distinct peaks, as seen in FIG. 4(D). Once a value greater than $\gamma_1$ (where $\gamma_1$=0.0625) is detected 240, signal (D) is passed into the packet/peak detector 250, which looks for this distinct three peak shape by finding maxima over 240 sample windows. The distinct, three peak shape (as shown in FIG. 4(D)) is detected when the current maximum of the 240 sample window is less than the maximum of the previous 240 sample window. Due to the properties of PN sequences (i.e. demonstrating high correlation when aligned, little or no correlation when not aligned) this type of detection is extremely robust. In FIG. 4(D), the highest peak indicates that both correlations are perfectly aligned. If the three-peak pattern is not detected, then the wake-up packet is determined to be invalid 255, and the packet detection block is reset. An exemplary explanation for packet/peak detection is further provided in FIG. 6.

Once the packet has been detected in 250, the OOK demodulator 260 calculates the decoding threshold for the receiver ID, action code, and CRC portions. This is performed by determining the 480 sample average, i.e. $\gamma_3$, 230 of the transmitted preamble sequence (2 times the 15-bit PN sequence, with 16 samples per symbol). The 480 sample average (i.e. $\gamma_3$) determined in 230 can further be multiplied by a factor $\alpha$, which has a value of slightly less than 1 to account for the fact that the preamble sequence contains slightly more ones than zeros.

The OOK Demodulator 260 downsamples signal (C) by 3n_sym 232, or in this case, 48, to obtain signal (E) with $\{d_n\}$ bits. Then, each downsampled bit of signal (E) is compared to $\gamma_3$ in 262, where if $d_n$ is greater than $\gamma_3$, a value of 1 is assigned to the bit, and if not, a value of 0 is assigned to the bit, to produce signal $\{b_n\}$ 264, which is sent to a packet parser (shown in FIG. 3).

Figure 3:
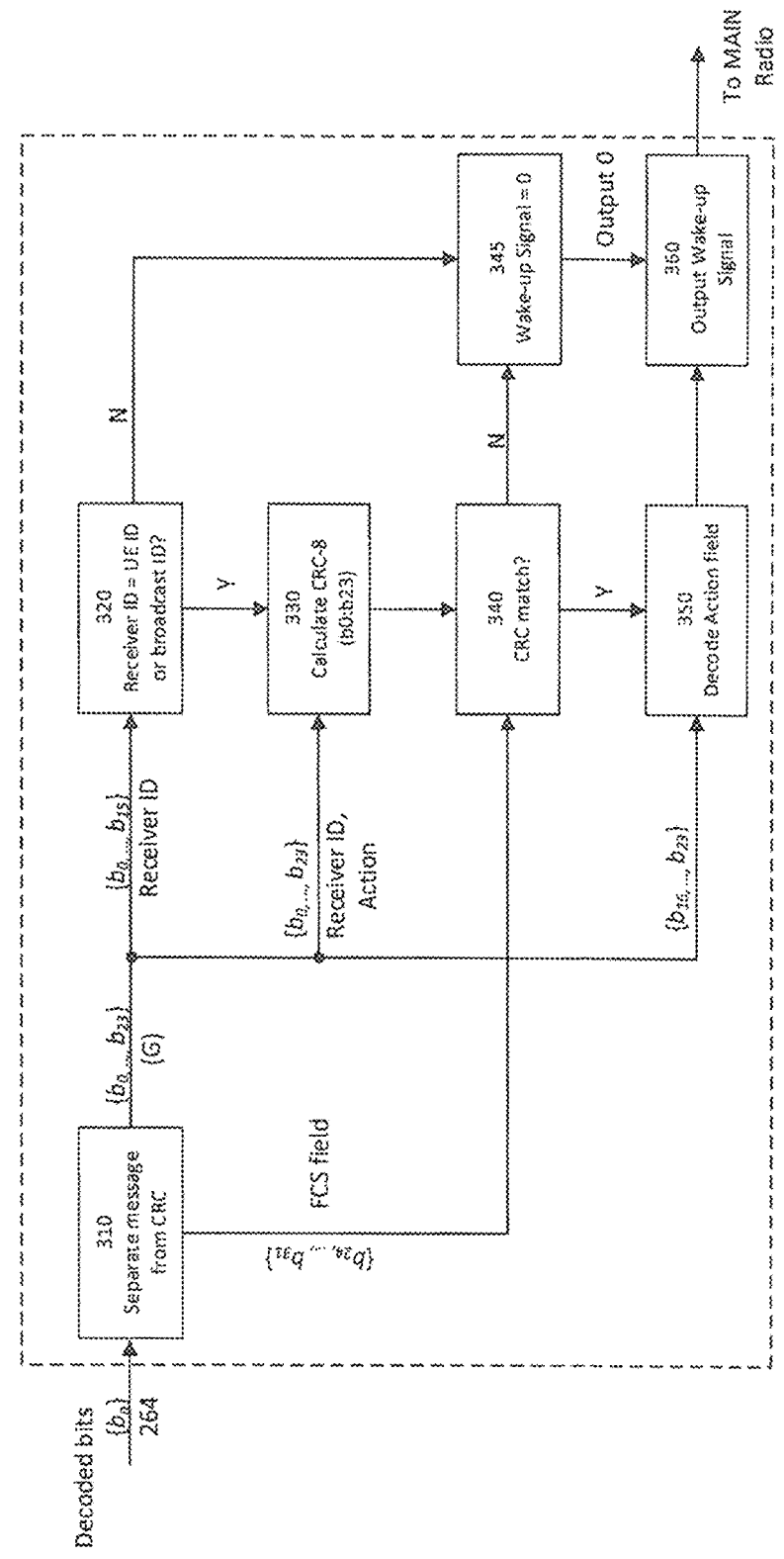
FIG. 3 shows a high level block diagram of a packet parser in an aspect of this disclosure.

FIG. 3 shows a packet parser 300 in an aspect of this disclosure. It is appreciated that packet parser 300 is exemplary in nature and may therefore be simplified for purposes of this disclosure.

The decoded bits $\{b_n\}$ 264 from the OOK demodulator 260 of FIG. 2 are separated 310 into two separate data streams, with one stream comprising the receiver ID and the action field $\{b_0, \ldots, b_{23}\}$ and the other stream comprising the FCS field $\{b_{24}, \ldots, b_{31}\}$, i.e. the CRC.

The Receiver ID $\{b_0, \ldots, b_{15}\}$ and the Action field $\{b_{16}, \ldots, b_{23}\}$ are further separated and the Receiver ID $\{b_0, \ldots, b_{15}\}$ is compared to packet parser's ID, e.g. the user equipment (UE) ID or broadcast ID. If the Receiver ID is a match, then the packet parser calculates the CRC of the Receiver ID and the Action field in 330 and performs a CRC check 340 with the FCS $\{b_{24}, \ldots, b_{31}\}$ to ensure that there were no bit errors in the transmission or decoding of the packet. Once the CRC check passes, then the Action Field, i.e. the Wake-Up signal, is decoded 350, and the non-zero Action Field is sent to the main radio as the wake-up signal 360. The main radio then uses the 8-bits of the Action field to tune to the specified radio channel. However, if either the Receiver ID or the CRC are not a match, then the wake-up signal is assigned a zero value 345, in which case, the wake-up unit will not trigger the main radio to wake up.

FIG. 4 shows a series of five graphs, (A)-(E), of the signals shown at corresponding points (A)-(E) in FIG. 2. It is appreciated that graphs (A)-(E) are exemplary in nature and may therefore be simplified for purposes of this explanation. The units of the y-axis for (A), (B), (C), and (E) are in volts while in (D) the y-axis is unit less since it comes after the correlator.

Graph (A) shows the signal at the output of the ADC of the AFE.

Graph (B) shows the signal after the absolute value of the signal in (A) is taken. However, as previously mentioned, if the AFE uses envelope detection, then taking the absolute value of the output of the ADC of the AFE would be unnecessary. The wake-up preamble portion of the signal is indicated by the boxed in area.

Graph (C) shows the signal after the sum of (n_sym/code_rate) samples at the start of the demodulation block. The data payload is indicated by the boxed area, and the first four bits, 0010, are shown.

Graph (D) shows the signal after adding the two samples a preamble length (preamble_len) apart prior to packet/peak detection. The three peaks used to identify the packet are shown. All three peaks are greater than the $\gamma_1$ value.

Graph (E) shows the signal after downsampling by (n_sym/code_rate) in the demodulation block. The example shown in Graph (E) also shows the comparison with $\gamma_3$. Note that $\gamma_3$ is in volts since we area using it to make a threshold comparison for decoding bits. The actual order of these two operations, i.e. the downsampling and the comparison, does not have any effect on the final result, so they may be performed in any order. However, depending on certain factors, e.g. clock frequencies, the downsampling rate, and data bitwidths, one implementation may be more power-efficient than the other.

FIG. 5A-5B shows a block diagram 500 showing the hardware realization of the packet detection, acquisition, and OOK demodulation blocks in an aspect of this disclosure. It is appreciated that block diagram 500 is exemplary in nature and may thus be simplified for purposes of this explanation.

As can be seen from diagram 500, a large amount of the hardware can be shared between the blocks due to the linear nature of the mathematical operations, i.e. the correlator, the threshold calculator (OOK demodulation), and the delay and add circuits share greater than 99% of the same circuitry, resulting in a very compact design with low latency.

The 240×240 sample correlator 535, 240-sample delay and add circuit 525, and the $\gamma_3$ calculation 530 are combined into a single circuit. First, the input samples of the preamble sequence are delayed by 240 cycles and added to the non-delayed sample in the delay and add 525. The output is then placed into a 224-sample delay line broken into 14 16-sample delays. The inputs/outputs at the 15 different points in this delay line are added together using an adder tree in the $\gamma_3$ calculation 530 and then scaled by a constant factor $\alpha$ to produce the weighted 480 sample average to be used as the optimal decoding threshold in the demodulation block 560. Additionally, the 15 different points in the delay line can also be added and subtracted from each other in a parallel adder tree to produce an output correlated to the desired PN sequence (1000 1111 0101 100). The two adder trees can also share six of the fixed-point adders between them, further reducing the hardware.

In the packet/peak detection branch 550, a rolling windowed maximum function 555 follows the 240-sample correlator 535 to perform the final detection and synchronization of the wake-up packet. To do this, a number, A, and a delayed version (through a delay line of power 2), B, are compared using B>A, as shown in 555. This comparison is used to select the larger number and its current index ($IDX_N$). The selector bit is then appended to the input to create the new index ($IDX_{N+1}$). To prevent redundant computation, the larger of A or B, with its new index, is then pushed into a delay line twice as long as the previous one. This new result and the output of the next delay line are then compared in the same manner with the result pushed into a new delay line (which doubles in length again). Using this implementation, the maximum and its corresponding position in the delay line can be calculated in an optimal $\log_2(WL)$ number of comparisons, where WL is the window length, an improvement over the traditional method of WL−1 comparisons. Once the maximum is detected, its index is used to synchronize the decoding path.

The hardware in an aspect of this disclosure is able to achieve low processing latency by taking advantage of the time difference between the start of the preamble and the receiver ID in the wake-up packet as shown in FIG. 1. The 16 times oversampling allows for 496 clock cycles computation between when the first symbol in the PN sequence of the Preamble is first received to when the first symbol of the receiver ID is received.

The decoding branch, i.e. the OOK demodulation with the 48 sample averaging, scaling, and threshold decoding, takes 294 cycles before down sampling occurs. The processing latency of the acquisition/detection branch, i.e. the 240×240 correlator, 16 sample averaging circuit, and the rolling window maximum detection circuit, is 754 clock cycles. The processing time difference between these two branches is 460 cycles, less than the 496 clock cycles of latency between the start of the transmission of the two signal branches. Therefore, by delaying the output of the decoding branch by 36 clock cycles, the ideal threshold decoding begins immediately following the 48 sample averaging step.

To reduce the power of the circuit implementation further, aggressive clock gating is used in an aspect of this disclosure. The window maximum detector is disabled unless the output of the 240-sample correlator exceeds a user specified threshold. Additionally, each flip-flop will perform self-clock gating if the input data does not change. These two clock gating schemes allows for greater than 97% of the flip-flops in the design to be clock gated after synthesis.

Due to the low frequency operation of the design, leakage power is reduced further through the use of high threshold, long channel devices. This allows for a ten times decrease in leakage power (from approximately 25 µW to less than 2 µW) for an area of about 15,000 µm² in a 14 nm technology. Results show that the LP-WUR digital baseband in an aspect of this disclosure can achieve a PER of about 10%, i.e. a bit error rate (BER) of about 0.2%, at −82 dBm, for a total system power of 7.1 µW and 12.5 µW at 30° C. and 70° C., respectively.

Figure 5C:
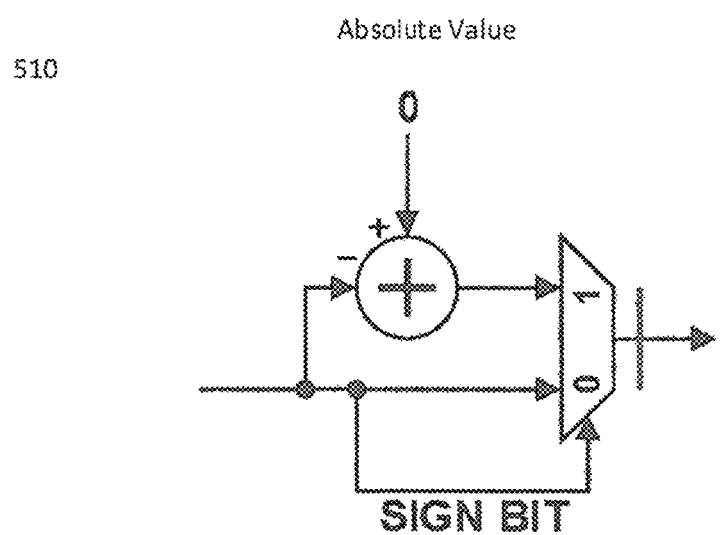
FIG. 5C-5G show components of the hardware realization shown in FIG. 5A-5B in more detail.
Figure 5D:
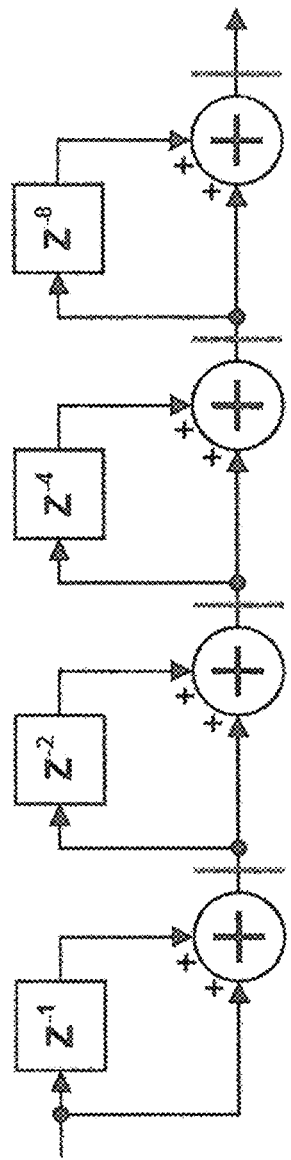
Figure 5E:
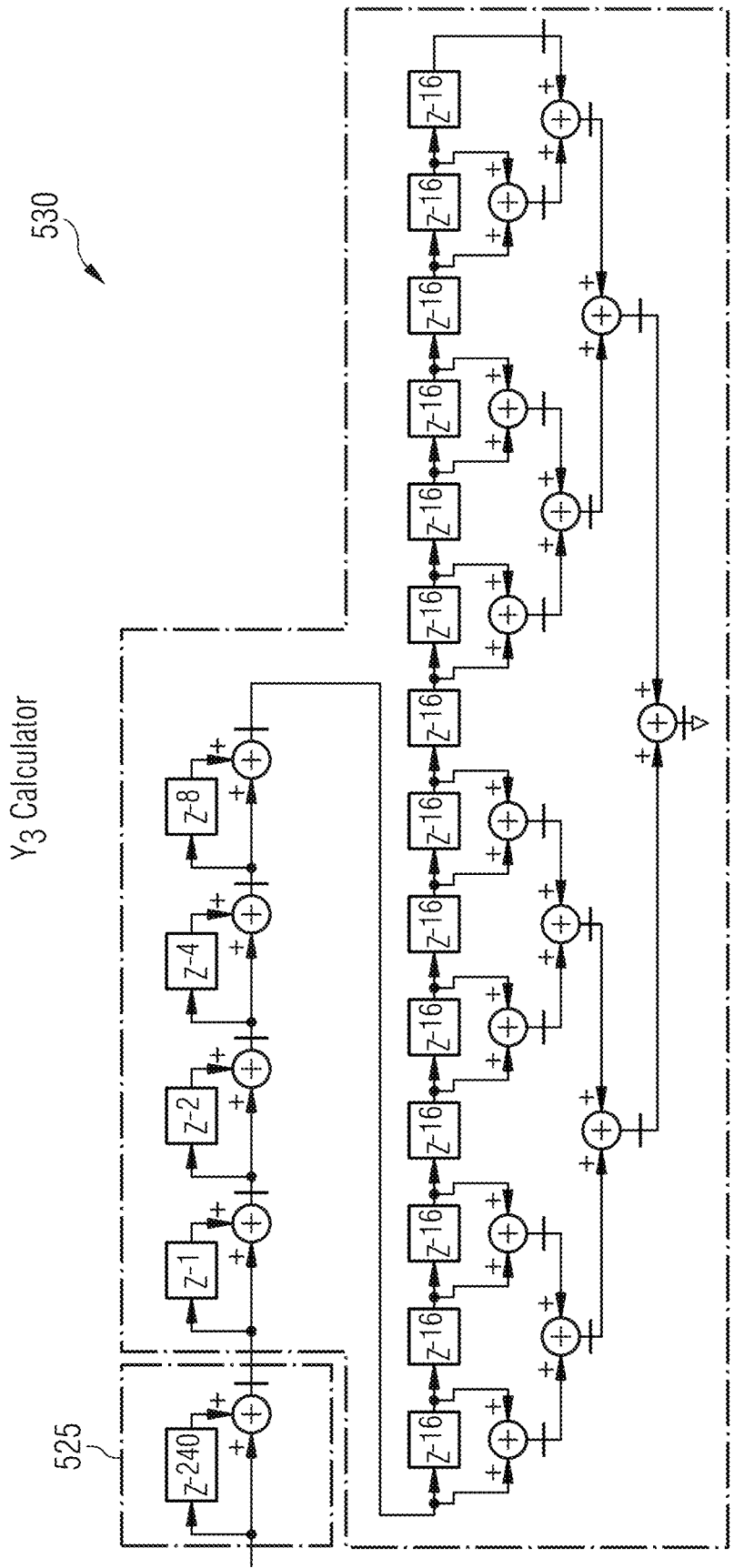

FIG. 5C-5G show respective components of the hardware realization of block diagram 500 depicted in FIG. 5A-5B. The components numbers of FIG. 5A-5B are replicated in the corresponding FIG. 5C-5G, e.g. the absolute value component 510 of FIG. 5A is shown as 510 in FIG. 5C.

FIG. 6 shows an example of the packet/peak detection method, through steps 600-630, in an aspect of this disclosure. The first maximum, or $MAX_1$, is depicted with the circular symbol and the second maximum, or $MAX_2$, is depicted with a square symbol. Furthermore, the window in which $MAX_1$ is determined is shown as the first and third vertical dashed lines (i.e. the dashed lines with greater spaces in between the dashes), and the window in which $MAX_2$ is determined is shown as the second and fourth vertical dashed lines (i.e. the dashed lines with smaller spaces in between the dashes).

Figure 5F:
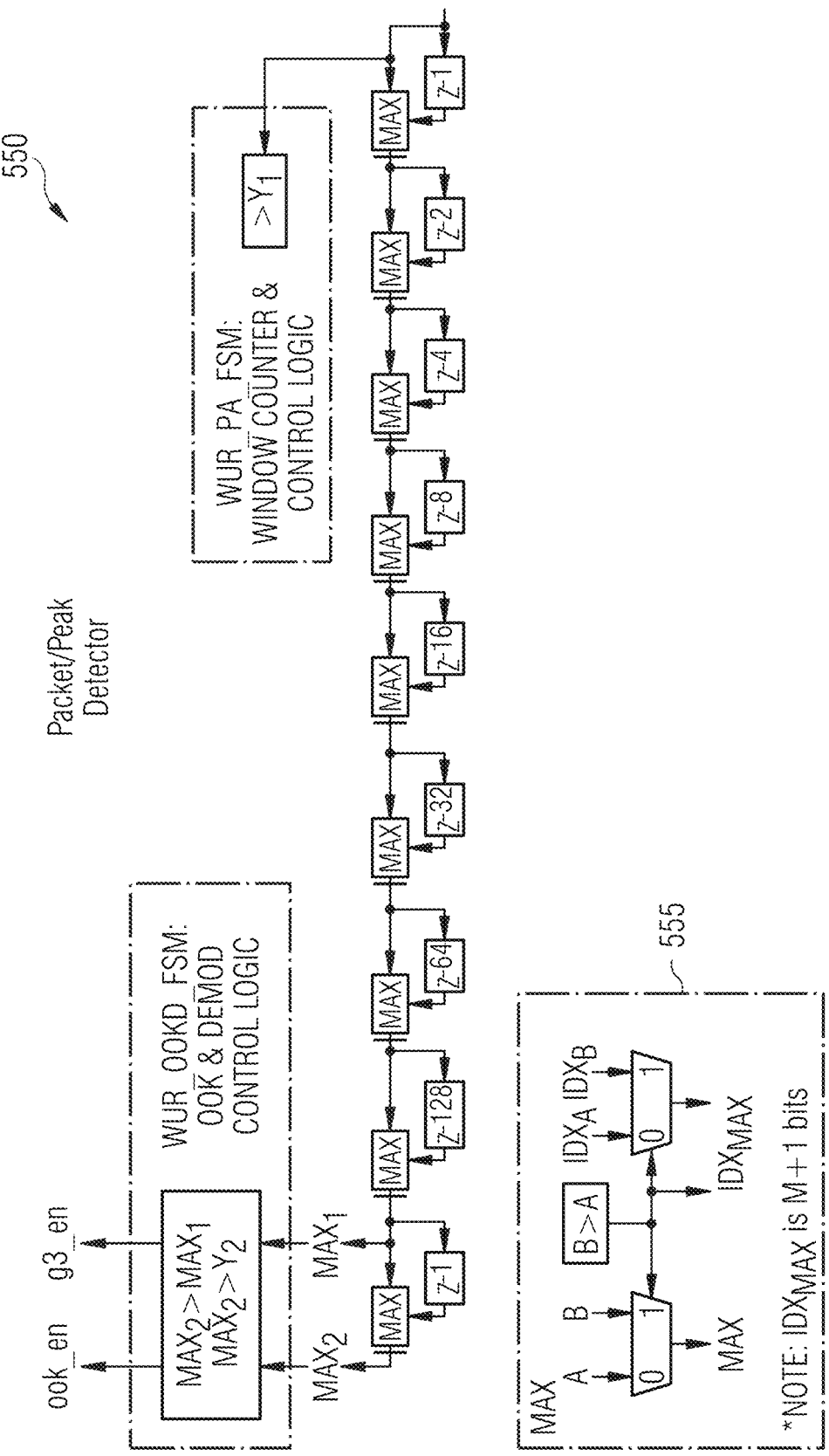
Figure 5G:
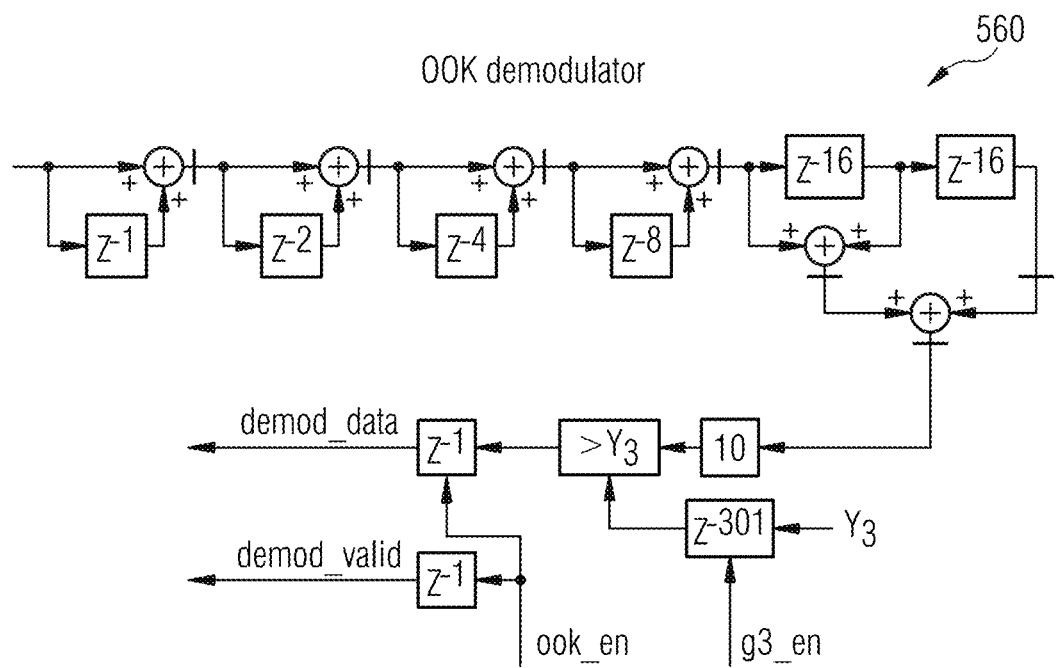

The control logic for the detection of the three peaks in FIG. 4(D) is shown in FIG. 5F, i.e. $MAX_2 > MAX_1$ and $MAX_2 > \gamma_2$, wherein $\gamma_2$ has a value of 0.1. The values of $\gamma_1$ and $\gamma_2$ (0.0625 and 0.1, respectively) were determined after a series of detailed simulations and calculations. Since both $\gamma_1$ and $\gamma_2$ make comparisons to values that come after the correlator, they are unit less.

In 600, the maximum points in each window, i.e. $MAX_1$ and for $MAX_2$, are determined and marked accordingly. However, since $MAX_1 > MAX_2$, the windows are rolled over, i.e. shifted along the signal, and the maximum in the new windows are taken in 610. Since $MAX_1 > MAX_2$, the windows are rolled over again, to 620 where the peaks in each window are determined again. In this case, $MAX_1 = MAX_2$.

In 630, $MAX_2 > MAX_1$, i.e. the previous peak ($MAX_2$) was the maximum peak, and assuming that $MAX_2 > \gamma_2$, the wake up packet is detected and proceeds to OOK demodulation.

Figure 7:
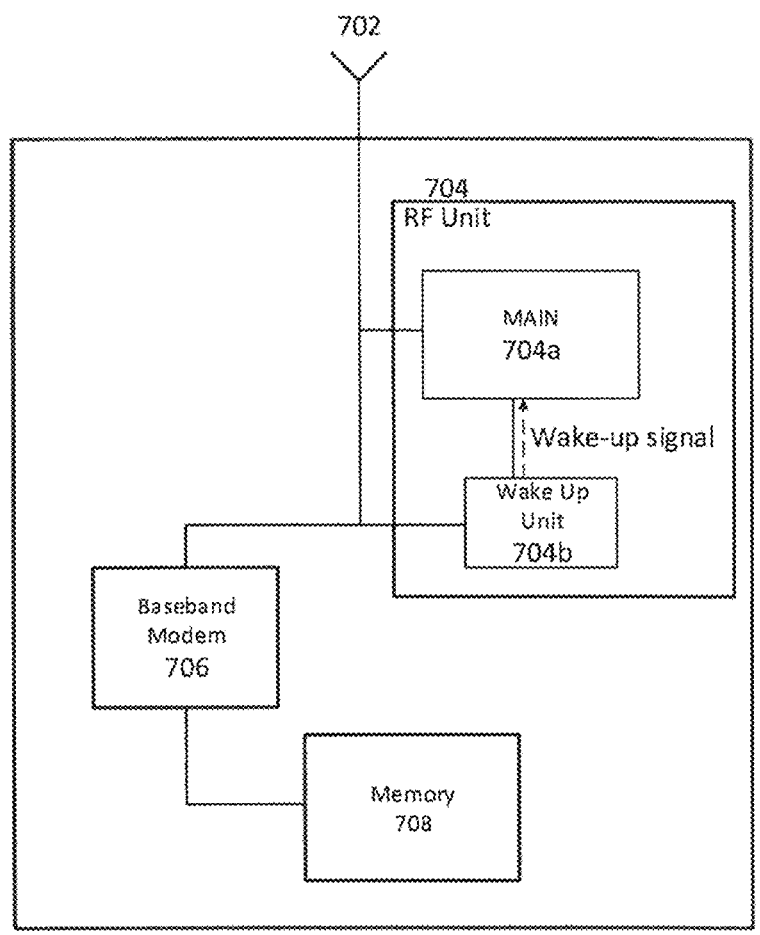
FIG. 7 shows a communication device in an aspect of this disclosure.

FIG. 7 shows a communication device 700 in an aspect of this disclosure. It is appreciated that device 700 is exemplary in nature and may therefore be simplified for purposes of this explanation.

As shown in FIG. 7, device 700 may include an antenna 702, a radio frequency (RF) unit 704, baseband modem 706, application processor 708, and a memory component 708. RF unit 104 may include, for example, a Main radio unit 704a, e.g. with a reception/transmission (Rx/Tx) unit, and a wake up unit 704b as shown in FIG. 1. While the RF unit is shown having Main and wake-up component, it is understood that this disclosure may also be applied to other RF unit configurations, e.g. a RF unit with a plurality of transmit components, an RF unit with one Rx component, an RF unit with more than two Rx components, etc.

These components may be implemented separately; however, it is appreciated that the configuration of device 700 is for purposes of explanation, and accordingly, one or more of the aforementioned components of device 700 may be integrated into a single equivalent component or divided into multiple components with collective equivalence. It is also appreciated that device 700 may have one or more additional components, such as hardware, software, or firmware elements. For example, device 700 may also include various additional components including processors, microprocessors, at least one power supply, peripheral device(s) and other specialty or generic hardware, processors, or circuits, etc., in order to support a variety of additional operations. For example, device 700 may also include a variety of user input/output devices, such as display(s), keypad(s), touchscreen(s), speaker(s), microphone(s), button(s), camera(s), etc. Furthermore, it is appreciated that the connections between components in device 700 may be modified.

In an overview, device 700 may be configured to receive and/or transmit wireless signals according to multiple different wireless access protocols or radio access technologies (RATs), for example, any one or combination of: Long-Term Evolution (LTE), Global System for Mobile Communications (GSM), Universal Mobile Telecommunications System (UMTS), Code Division Multiple Access (CDMA), Wideband CDMA (W-CDMA), Wi-Fi, Wireless Local Area Network (WLAN), Bluetooth, etc. It is appreciated that separate components may be provided for each distinct type of compatible wireless signal, such as a dedicated LTE antenna, RF transceiver, and baseband modem for LTE reception and transmission and a dedicated Wi-Fi antenna, RF transceiver, and a baseband modem for Wi-Fi reception and transmission, etc. Alternatively, one or more components of device 700 may be shared between different wireless access protocols, such as, for example, by sharing an antenna 702 between multiple different wireless access protocols or RATs. In an exemplary aspect of this disclosure, RF unit 704 and/or baseband modem 706 may operate according to multiple communication access protocols (i.e. "multi-mode"), and thus may be configured to support one or more of LTE, GSM, and/or UMTS access protocols.

Furthermore, RF unit 704 may receive frequency wireless signals via antenna 702, which may be implemented, for example, as a single antenna or an antenna array composed of multiple antennas. Antenna 702 may be an external antenna or an internal antenna. RF unit 704 may include various reception circuitry elements, for example, analog circuitry configured to process externally received signals, such as circuitry to convert externally received RF signals to baseband and/or intermediate frequencies. RF unit 704 may also include amplification circuitry to amplify externally received signals, such power amplifiers and/or Low Noise Amplifies, although it is appreciated that such components may also implemented separately. RF unit 704 may additionally include various transmission circuit elements configured to transmit signals, such as, for example, baseband and/or intermediate frequency signals provided by the baseband modem 706, which may include mixing circuitry to modulate signals onto one or more radio frequency carrier waves and/or amplification circuitry to amplify internal signals before transmission. The RF unit 704 may provide such signals to antenna 702 for wireless transmission. Although not explicitly depicted in FIG. 7, RF unit 704 may be additionally connected to other components of the device 700.

RF unit 704 may consist of a Main radio unit 704*a* and a low-power wake up radio unit 704*b*, or other variations of reception and transmission components. In the exemplary configuration shown in FIG. 7, the wake up unit 704*b* may be configured to detect/receive a wake up signal from an external source and thereafter, send a wake up signal to the main radio unit 704*a*. Wake up unit 704*b* may implement circuitry to acquire, detect, and demodulate a wake up packet and send a wake up signal to the main radio unit 704*a* as disclosed in this paper. For example, wake up unit 704 may comprise, among other components: an AFE with ADC circuitry, an OOK demodulator circuit, a peak detection circuit, and other circuits configured to implement methods and processes herein described.

Baseband modem 106 may include one or more digital processing circuits and a baseband memory. Baseband modem 106 may further include one or more additional components, including one or more analog circuits.

The digital processing circuits may be composed of various processing circuitry configured to perform baseband (also including "intermediate") frequency processing, such as Analog to Digital Converters and/or Digital to Analog Converters, modulation/demodulation circuitry, encoding/decoding circuitry, audio codec circuitry, digital signal processing circuitry, etc. The digital processing circuit(s) may include hardware, software, or a combination of hardware and software. Specifically, digital processing circuit(s) of baseband modem 106 may include one or more logic circuits, processors, microprocessors, controllers, microcontrollers, scalar processors, vector processors, Central Processing Units (CPU), Graphics Processing Units (GPU) (including General-Purpose Computing on GPU (GPGPU)), Digital Signal Processors (DSP), Field Programmable Gate Arrays (FPGA), integrated circuits, Application Specific Integrated Circuits (ASIC), etc., or any combination thereof.

The baseband memory may include volatile and/or non-volatile memory, including random access memory (RAM), read-only memory (ROM), flash memory, solid-state storage, magnetic tape, hard disk drive(s), optical drive(s), register(s), shift register(s), processor register(s), data buffer(s) etc., or any combination thereof. The baseband memory may be configured to store software elements, which may be retrieved and executed using a processor component of digital processing circuitry. The baseband memory may be implemented as one or more separate components in the baseband modem 706 and may also be partially or fully integrated with the digital processing circuitry.

The baseband modem 706 may be configured to operate one or more protocol stacks, such as a GSM protocol stack, an LTE protocol stack, a UMTS protocol stack, a CDMA protocol stack, etc. or any combination thereof. Baseband modem 706 may be multimode and may thus be configured to operate in accordance with multiple RATs by executing multiple protocol stacks simultaneously. The digital processing circuit(s) in the baseband modem may therefore include a processor configured to execute program code in accordance with the protocol stacks of each associated RAT. The baseband memory may be store the aforementioned program code. The baseband modem 706 may be configured to control one or more further components of device 700. The protocol stack(s) of baseband modem 706 may be configured to control operation of the baseband modem 706, such as in order to transmit and receive mobile communication in accordance with the corresponding RAT(s).

The baseband modem 706 may include physical layer (PHY) processing circuitry, which may perform PHY layer, i.e. Layer 1, transmission and reception processing. Physical layer processing circuitry may accordingly perform one or more of envelope detection, absolute value calculation, packet acquisition, peak detection, OOK demodulation, error detection, forward error correction encoding/decoding, channel coding and interleaving, physical channel modulation/demodulation, physical channel mapping, radio measurement and search, frequency and time synchronization, antenna diversity processing, power control and weighting, rate matching, retransmission processing, etc. Physical layer processing circuitry may be structurally realized as hardware logic, e.g. as an integrated circuit or FPGA, as software logic, e.g. as program code defining arithmetic, control, and I/O instructions stored in a non-transitory computer-readable storage medium and executed on a processor, or as a combination of hardware and software logic. The physical layer processing circuitry may include a control circuit such as a processor configured to control the various hardware and software processing components of physical layer processing circuitry in accordance with physical layer control logic defined by the communications protocol for the relevant RATs.

Baseband modem 706 may further include circuitry responsible for controlling the radio communication components of device 700 in accordance with communication protocols of each supported RAT, and accordingly may represent the Access Stratum and Non-Access Stratum (encompassing Layer 2 and 3) of each supported RAT.

Figure 7A:
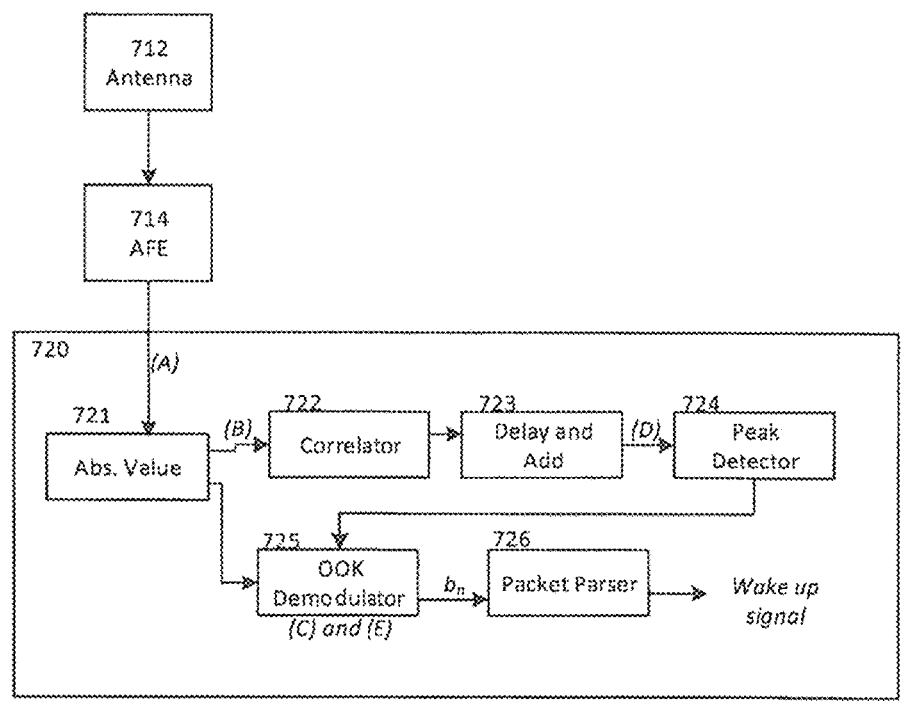
FIG. 7A shows an internal diagram of a communication device in an aspect of this disclosure.

FIG. 7A shows an internal diagram 710 of a communication device configured to implement a low power wake up receiver in order to power on a main radio unit in an aspect of this disclosure. It is appreciated that internal diagram 710 is exemplary in nature and may therefore omit certain components of the communication device that are not directly related to this portion of the disclosure in order to simplify the explanation.

As shown in FIG. 7A, a physical layer processing circuit 720 is coupled to the antenna 712 through the Analog front end (AFE) 714. AFE 714 may include analog amplifiers, filters, ADC, etc. Physical layer processing circuit 720 may include absolute value circuitry 721 (this component may be unnecessary if AFE includes envelope detection), correlation circuitry 722 (i.e. 240×240 correlator), delay and add circuitry 723, a peak detection circuit 724, OOK demodulation circuitry 725 (including down-sampling, $\gamma_3$ calculation circuitry) configured to deliver a bit stream, $b_n$, to packet parser 726, which configured to perform the final steps (i.e. receiver ID matching and error detection) prior to issuing the wake up signal to the main RF receiver of the communication device.

It is understood that a person of skill in the art will appreciate the corresponding structure disclosed herein, be it in explicit reference to a physical structure and/or in the form of mathematical formulas, prose, flow charts, or any other manner providing sufficient structure (such as e.g. regarding an algorithm). The components of baseband modem 706 may be detailed herein substantially in terms of functional operation in recognition that a person of skill in the art may readily appreciate the various possible structural realizations of baseband modem 706 using digital processing circuitry that will provide the desired functionality.

In a first exemplary aspect of the disclosure, the processing circuitry in a device with a low-power wake up receiver is configured to receive a wake up packet at a the low-power receiver of the communication device, the wake up packet comprising a wake up preamble with a pseudorandom noise (PN) sequence, a receiver ID, a payload, and a frame check sequence (FCS); determine whether the wake up packet should be decoded; use the PN sequence to set a decoding threshold; decode the receiver ID, the payload, and the frame check sequence using the decoding threshold; and selectively send a signal to power on the first receiver, i.e. the main receiver.

Figure 8:
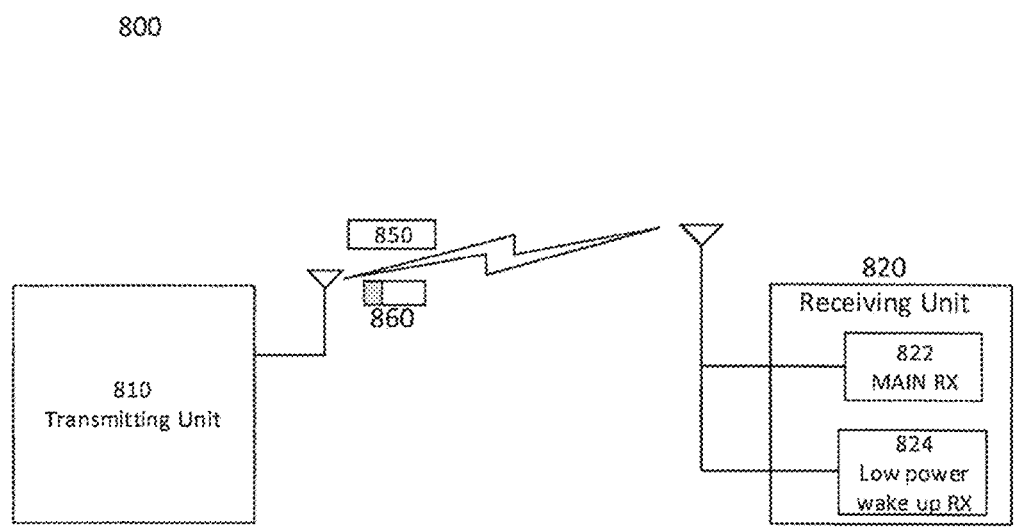
FIG. 8 shows a communication network in an aspect of this disclosure.

FIG. 8 shows a communication network 800 in an aspect of this disclosure. It is appreciated that network 800 is exemplary in nature and may therefore be simplified for purposes of this explanation.

Transmitting Unit 810, i.e. the source node, may be configured to transmit data packets 850 and wake up packets 860 to receiving unit 820. Transmitting unit is configured to transmit wake up packets 860 with the packet structure disclosed in FIG. 1. Transmitting unit include hardware and/or software to code and transmit wake up packets outlined by the process shown in FIG. 10.

The shaded portion of packet 860 may correspond to the RAT-specific preamble, e.g. an 802.11 preamble for WiFi, and the unshaded portion of packet 860 may correspond to the payload, which may be OOK-modulated.

Transmitting unit 810 may further be configured to transmit a wake up packet 860 prior to the transmission of a data packet 850.

Receiving unit 820, i.e. the destination node, is configured to turn off Main RF unit 822, e.g. Main WiFi receiver, and keep the Low power wake up Rx 824 turned on in order to monitor for incoming signals/packets. The Low power wake up Rx 824 is configured to acquire, detect, and demodulate wake up packets as disclosed in this paper, and if appropriate, send the Main RF unit 822 a wake up signal in order to receive data packets 850.

Figure 9:
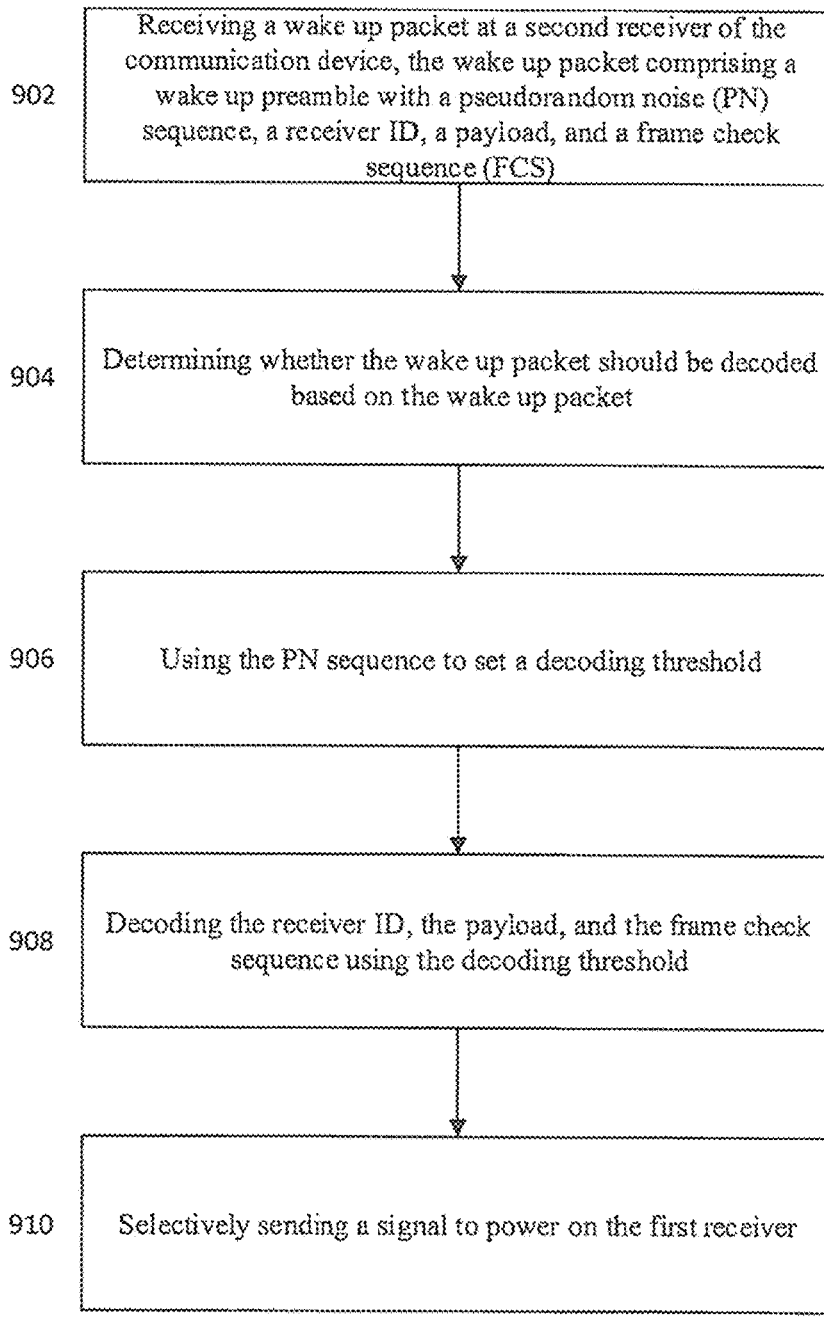
FIG. 9 shows a flow chart in an aspect of this disclosure.

FIG. 9 shows a flowchart 900 in an aspect of this disclosure. It is appreciated that flowchart 900 is exemplary in nature and may therefore be simplified for purposes of this explanation.

In 902, wake up packet is received by the second receiver of the communication device, the wake up packet comprising a wake up preamble with a pseudorandom noise (PN) sequence, a receiver ID, a payload, and a frame check sequence (FCS).

In 904, it is determined whether the wake up packet should be decoded based on the wake up packet. This can be determined, for example, by using the detection hardware, e.g. a 240-correlator circuit, delay and add circuit, 16-sample averaging circuit, and the rolling window maximum detecting circuit disclosed herein.

In 906, the PN sequence is used to set the decoding threshold. This can be done, for example, by using the OOK demodulation circuit disclosed herein.

In 908, the receiver ID, the payload, and the frame check sequence are decoded using the decoding threshold determined in 906.

In 910, the signal to power on the first receiver is selectively sent by the second receiver. This can be done, for example, after determining whether the receiver ID matched an ID of the communication device, and performing a FCS check to determine if there were any errors in the transmission or decoding of the packet. If it is determined that the receiver ID is a match and the FCS check is a match, then the second receiver may send a signal to power on the first receiver.

FIG. 10 shows a flowchart 1000 of process in a transmitting device in an aspect of this disclosure. It is appreciated that flowchart 1000 is exemplary in nature and may therefore be simplified for purposes of this explanation.

In 1002, the transmitting device codes the wake up preamble portion of the wake up packet, wherein the wake up preamble comprises a repeated pseudorandom noise (PN) sequence.

In 1004, the transmitting device codes a data portion of the wake up packet, wherein the data portion comprises a receiver ID, a payload, and a frame check sequence.

In 1006, the transmitting device transmits the wake up packet to a second device in order to power on the main receiver so the transmitting device may send data to the second device.

In Example 1, a method for a communication device to power on a first receiver, comprising: receiving a wake up packet at a second receiver of the communication device, the wake up packet comprising a wake up preamble with a pseudorandom noise (PN) sequence, a receiver ID, a payload, and a frame check sequence (FCS); determining whether the wake up packet should be decoded based on the wake up packet; using the PN sequence to set a decoding threshold; decoding the receiver ID, the payload, and the frame check sequence using the decoding threshold; and selectively sending a signal to power on the first receiver.

In Example 2, the subject matter of Example 1 may include wherein the PN sequence is repeated in the wake up preamble.

In Example 3, the subject matter of Examples 1-2 may include wherein the PN sequence is 15 bits.

In Example 4, the subject matter of Examples 1-3 may include oversampling the wake up packet about 16 times per bit to generate 16 samples per bit.

In Example 5, the subject matter of Example 4 may include averaging the 16 samples per bit.

In Example 6, the subject matter of Example 5 may include putting the PN sequence through a correlator In Example 7, the subject matter of Example 6 may include wherein the correlator is a 240-bit correlator.

In Example 8, the subject matter of Example 6-7 may include delaying an output of the correlator and adding the output of the correlator back onto itself to produce an add and delay (AD) output.

In Example 9, the subject matter of Example 8 may include wherein the delay is about 240 cycles.

In Example 10, the subject matter of Examples 8-9 may include determining whether the wake up packet should be decoded by detecting a maximum of the AD output and comparing it to a predetermined value, wherein if the maximum of the AD output is higher than the predetermined value, decoding the wake up packet.

In Example 11, the subject matter of Example 10 may include detecting the maximum of the AD output using a rolling window, wherein the rolling window determines a local maximum of the AD output within its bounds and compares it to a previously determined maximum of the AD output.

In Example 12, the subject matter of Examples 10-11 may include setting the decoding threshold by using an on-off keying (OOK) demodulator.

In Example 13, the subject matter of Example 12 may include wherein the OOK demodulator is configured to set the decoding threshold by averaging a set of samples of the PN sequence.

In Example 14, the subject matter of Example 13 may include wherein the set of samples is about two times the 16 samples of the 15-bit PN sequence.

In Example 15, the subject matter of Examples 13-14 may include wherein the set of samples is about 480 samples.

In Example 16, the subject matter of Examples 13-15 may include determining each decoded bit of the receiver ID, the payload, and the frame check sequence by comparing it to the decoding threshold.

In Example 17, the subject matter of Examples 1-16 may include matching the receiver ID to a communication device ID.

In Example 18, the subject matter of Examples 1-17 may include calculating a frame check from the receiver ID and the payload.

In Example 19, the subject matter of Examples 1-18 may include comparing the frame check to the FCS.

In Example 20, the subject matter of Examples 1-19 may include wherein the first receiver is a main receiver of the communication device.

In Example 21, the subject matter of Examples 1-20 may include wherein the second receiver is a low power receiver of the communication device.

In Example 22, the subject matter of Example 21 may include wherein the low power receiver comprises a 14 nm complementary metal oxide semiconductor (CMOS).

In Example 23, a method in a first device to transmit a wake up packet to a second device, comprising: coding a wake up preamble portion of the wake up packet, wherein the wake up preamble comprises a repeated pseudorandom noise (PN) sequence; coding a data portion of the wake up packet, wherein the data portion comprises a receiver ID, a payload, and a frame check sequence; and transmitting the wake up packet to the second device.

In Example 24, the subject matter of Example 23 may include wherein the PN sequence is repeated two times.

In Example 25, the subject matter of Examples 23-24 may include coding the data portion of the wake up packet with an error correction.

In Example 26, the subject matter of Example 25 may include wherein the error correction comprises coding the data portion at about a 1-to-3 rate.

In Example 27, the subject matter of Examples 23-26 may include coding the wake up preamble at about a 1-to-1 rate.

In Example 28, a method to power on a first receiver at a first device, comprising: transmitting a wake up packet from a second device, the wake up packet comprising a preamble, a receiver ID, a payload, and a frame check sequence (FCS), wherein the preamble comprises a pseudorandom noise (PN) sequence; receiving the wake up packet with a second receiver at the first device; determining whether the wake up packet should be decoded based on the wake up packet; setting a decoding threshold using the PN sequence; decoding the wake up packet using the decoding threshold; and selectively sending a wake up signal to the main receiver.

In Example 29, the subject matter of Example 28 may include wherein the PN sequence is repeated in the wake up preamble.

In Example 30, the subject matter of Examples 28-29 may include wherein the PN sequence is 15 bits.

In Example 31, the subject matter of Examples 28-30 may include oversampling the wake up packet about 16 times per bit to generate 16 samples per bit.

In Example 32, the subject matter of Example 31 may include putting the PN sequence through a correlator.

In Example 33, the subject matter of Example 32 may include putting the PN sequence through a correlator.

In Example 34, the subject matter of Example 33 may include wherein the correlator is a 240-bit correlator.

In Example 35, the subject matter of Examples 33-34 may include delaying an output of the correlator and adding the output back onto itself to produce an add and delay (AD) output.

In Example 36, the subject matter of Example 35 may include wherein the delay is about 240 cycles.

In Example 37, the subject matter of Examples 35-36 may include determining whether the wake up packet should be decoded by detecting a maximum of the AD output and comparing it to a predetermined value, wherein if the maximum of the AD output is higher than the predetermined value, decoding the wake up packet.

In Example 38, the subject matter of Example 37 may include detecting the maximum of the AD output using a rolling window, wherein the rolling window determines a local maximum of the AD output within its bounds and compares it to a previously determined maximum of the AD output.

In Example 39, the subject matter of Examples 37-38 may include setting the decoding threshold by using an on-off keying (OOK) demodulator.

In Example 40, the subject matter of Example 39 may include wherein the OOK demodulator is configured set the decoding threshold by averaging a set of samples of the PN sequence.

In Example 41, the subject matter of Example 40 may include wherein the set of samples is two times the 16 samples of the 15-bit PN sequence.

In Example 42, the subject matter of Examples 40-41 may include wherein the set of samples is about 480 samples.

In Example 43, the subject matter of Examples 40-42 may include determining each decoded bit of the receiver ID, the payload, and the frame check sequence by comparing it to the decoding threshold.

In Example 44, the subject matter of Examples 28-43 may include matching the receiver ID to a communication device ID.

In Example 45, the subject matter of Examples 28-44 may include calculating a frame check from the receiver ID and the payload.

In Example 46, the subject matter of Examples 28-45 may include comparing the frame check to the FCS.

In Example 47, the subject matter of Examples 28-46 may include wherein the first receiver is a main receiver of the communication device.

In Example 48, the subject matter of Examples 28-47 may include wherein the second receiver is a low power receiver of the communication device.

In Example 49, the subject matter of Example 48 may include wherein the low power receiver comprises a 14 nm complementary metal oxide semiconductor (CMOS).

In Example 50, a communication device configured to power on a main receiver to receive data from a network comprising: a low power receiver configured to receive a wake up packet, comprising a preamble, from the network and oversample the wake up packet; a circuit arrangement comprising: a correlator configured to correlate the oversampled portion of the preamble; a delay and adder configured to take an output of the correlator, delay the output of the correlator, and add the output of the correlator back onto itself to produce a delay output; a peak detector configured to detect a peak pattern in the delay output; a demodulator configured to calculate a decoding threshold value to produce a demodulated data; and a packet parser configured to check the demodulated data for a data set in order to selectively output a nonzero signal to power on the main receiver.

In Example 51, the subject matter of Example 50 may include wherein the wake up packet further comprises a receiver ID, a payload, and a frame check sequence.

In Example 52, the subject matter of Example 51 may include wherein the receiver ID, the payload, and the frame check sequence are coded at a 1-to-3 rate.

In Example 53, the subject matter of Examples 50-52 may include wherein the preamble comprises a pseudorandom noise (PN) sequence.

In Example 54, the subject matter of Example 53 may include wherein the PN sequence is 15 bits.

In Example 55, the subject matter of Examples 53-54 may include wherein the PN sequence is repeated.

In Example 56, the subject matter of Examples 50-55 may include the low power receiver further configured to oversample the wake up packet about 16 times to generate 16 samples per bit.

In Example 57, the subject matter of Example 56 may include the circuit arrangement further configured to average the 16 samples of each of the bits of the wake up packet.

In Example 58, the subject matter of Examples 50-57 may include wherein the correlator is a 240-bit correlator.

In Example 59, the subject matter of Examples 50-58 may include wherein the delay and adder is configured to delay the output of the correlator by about 240 cycles.

In Example 60, the subject matter of Example 50-59 may include wherein the peak detector is configured to detect the peak pattern after determining that the peak pattern has a value greater than a first threshold.

In Example 61, the subject matter of Example 60 may include wherein the first threshold is about 0.0625. The about 0.0625 value may fall anywhere between about 0.05-0.075.

In Example 62, the subject matter of Examples 50-61 may include the peak detector further configured to determine the peak pattern by detecting the maximum of the AD output using a rolling window, wherein the rolling window determines a local maximum of the AD output within its bounds and compares it to a previously determined maximum of the AD output.

In Example 63, the subject matter of Example 62 may include wherein the peak detector determines the peak pattern when a current maximum of the rolling window is less than the previously determined maximum of the AD output.

In Example 64, the subject matter of Examples 62-63 may include wherein the window spans about 240 samples. The window may be in the range of 200-300 samples.

In Example 65, the subject matter of Examples 62-64 may include wherein the peak detector is configured to compare the maximum of the AD output to a second threshold value.

In Example 66, the subject matter of Example 65 may include wherein the second threshold value is about 0.1. The about 0.1 value may fall within the range of about 0.075-0.125.

In Example 67, the subject matter of Examples 65-66 may include wherein the demodulator is further configured to demodulate the data if the maximum of the AD output is greater than the second threshold value.

In Example 68, the subject matter of Examples 50-67 may include wherein the demodulator is an on-off keying (OOK) demodulator.

In Example 69, the subject matter of Examples 50-68 may include wherein the demodulator is configured to calculate the decoding threshold value by averaging a set of samples from the oversampled preamble sequence.

In Example 70, the subject matter of Example 69 may include wherein the set of bits is a multiple of the product of the bits in the preamble sequence and the number oversamples of the wake up packet.

In Example 71, the subject matter of Examples 69-70 may include wherein the set of samples is about 480 samples.

In Example 72, the subject matter of Examples 50-71 may include wherein the data set comprises a first data comprising a receiver ID.

In Example 73, the subject matter of Examples 50-72 may include wherein the data set comprises second data comprising an action field sequence.

In Example 74, the subject matter of Examples 50-73 may include wherein the data set comprises a third data comprising a frame check sequence.

In Example 75, the subject matter of Example 74 may include wherein the frame check sequence is a cyclic redundancy check (CRC).

In Example 76, the subject matter of Example 72 may include wherein the packet parser is further configured to check if the receiver ID matches a device ID.

In Example 77, the subject matter of Example 76 may include wherein if the receiver ID does not match the device ID, the packet parser is further configured to output a zero value as a signal to the main receiver.

In Example 78, the subject matter of Examples 50-76 may include wherein the packet parser is further configured to perform a frame check using the third data.

In Example 79, the subject matter of Example 78 may include wherein if the frame check is does not match, the packet parser is further configured to output a zero value as a signal to the main receiver.

In Example 80, the subject matter of Examples 78-79 may include wherein if the frame check is a match, the packet parser is further configured to decode the second data.

In Example 81, the subject matter of Example 80 may include wherein the decoded second data is output as the nonzero signal to power on the main receiver.

In Example 82, a circuit arrangement comprising: a correlator configured to correlate an oversampled portion of a preamble of a wake up packet; a delay and adder configured to take an output of the correlator, delay the output of the correlator, and add the output of the correlator back onto itself to produce a delay output; a peak detector configured to detect a peak pattern in the delay output; a demodulator configured to calculate a decoding threshold value to produce a demodulated data of the wake up packet; and a packet parser configured to check the demodulated data for a data set in order to selectively output a nonzero signal.

In Example 83, the subject matter of Example 82 may include wherein the wake up packet further comprises a receiver ID, a payload, and a frame check sequence.

In Example 84, the subject matter of Example 83 may include wherein the receiver ID, the payload, and the frame check sequence are coded at about a 1-to-3 rate.

In Example 85, the subject matter of Examples 82-84 may include wherein the preamble comprises a pseudorandom noise (PN) sequence.

In Example 86, the subject matter of Example 85 may include wherein the PN sequence is 15 bits.

In Example 87, the subject matter of Examples 85-86 may include wherein the PN sequence is repeated.

In Example 88, the subject matter of Examples 82-87 may include further comprising a receiving circuit which oversamples the wake up packet.

In Example 89, the subject matter of Example 88 may include wherein the receiving circuit oversamples the wake up packet about 16 times to generate 16 samples per bit.

In Example 90, the subject matter of Example 89 may include further comprising a sample averaging circuit configured to average the 16 samples of each of the bits of the wake up packet.

In Example 91, the subject matter of Examples 82-90 may include wherein the correlator is a 240-bit correlator.

In Example 92, the subject matter of Examples 82-91 may include wherein the delay and adder is configured to delay the output of the correlator by about 240 cycles.

In Example 93, the subject matter of Examples 82-92 may include wherein the peak detector is configured to detect the peak pattern after determining that the peak pattern has a value greater than a first threshold.

In Example 94, the subject matter of Example 93 may include wherein the first threshold is about 0.0625. The about 0.0625 value may fall within the range of about 0.05-0.075.

In Example 95, the subject matter of Examples 82-94 may include the peak detector further configured to determine the peak pattern by detecting the maximum of the AD output using a rolling window, wherein the rolling window determines a local maximum of the AD output within its bounds and compares it to a previously determined maximum of the AD output.

In Example 96, the subject matter of Example 95 may include wherein the peak detector determines the peak pattern when a current maximum of the rolling window is less than the previously determined maximum of the AD output.

In Example 97, the subject matter of Examples 95-96 may include wherein the window spans about 240 samples. The window may be in the range of 200-300 samples.

In Example 98, the subject matter of Examples 95-97 may include wherein the peak detector is then configured to compare the maximum of the AD output to a second threshold value.

In Example 99, the subject matter of Example 98 may include wherein the second threshold value is about 0.1. The about 0.1 value may range from about 0.075-0.125.

In Example 100, the subject matter of Examples 82-99 may include wherein the demodulator is further configured to demodulate the data if the maximum of the AD output is greater than the second threshold value.

In Example 101, the subject matter of Examples 82-100 may include wherein the demodulator is an on-off keying (OOK) demodulator.

In Example 102, the subject matter of Examples 82-101 may include wherein the demodulator is configured to calculate the decoding threshold value by averaging a set of samples from the oversampled preamble sequence.

In Example 103, the subject matter of Example 102 may include wherein the set of bits is a multiple of the product of the bits in the preamble sequence and the number oversamples of the wake up packet.

In Example 104, the subject matter of Examples 102-103 may include wherein the set of samples is about 480 samples.

In Example 105, the subject matter of Examples 82-104 may include wherein the data set comprises a first data comprising a receiver ID.

In Example 106, the subject matter of Examples 82-105 may include wherein the data set comprises second data comprising an action field sequence.

In Example 107, the subject matter of Examples 82-106 may include wherein the data set comprises a third data comprising a frame check sequence.

In Example 108, the subject matter of Example 107 may include wherein the frame check sequence is a cyclic redundancy check (CRC).

In Example 109, the subject matter of Example 105 may include wherein the packet parser is further configured to check if the receiver ID matches a device ID.

In Example 110, the subject matter of Example 109 may include wherein if the receiver ID does not match the device ID, the packet parser is further configured to output a zero value as a signal to the main receiver.

In Example 111, the subject matter of Examples 82-110 may include wherein the packet parser is further configured to perform a frame check using the third data.

In Example 112, the subject matter of Example 111 may include wherein if the frame check is does not match, the packet parser is further configured to output a zero value as a signal to the main receiver.

In Example 113, the subject matter of Examples 111-112 may include wherein if the frame check is a match, the packet parser is further configured to decode the second data.

In Example 114, the subject matter of Example 113 may include wherein the decoded second data is output as the nonzero signal.

In Example 115, the subject matter of Example 114 may include further comprising a main radio frequency unit configured to power on after receiving the nonzero signal.

In Example 116, a non-transitory computer readable medium with program instructions which when executed cause a processor of a communication device to power on a first receiver, comprising: receiving a wake up packet at a second receiver of the communication device, the wake up packet comprising a wake up preamble with a pseudorandom noise (PN) sequence, a receiver ID, a payload, and a frame check sequence (FCS); determining whether the wake up packet should be decoded based on the wake up packet; using the PN sequence to set a decoding threshold; decoding the receiver ID, the payload, and the frame check sequence using the decoding threshold; and selectively sending a signal to power on the first receiver.

In Example 117, the subject matter of Example 116 may include wherein the PN sequence is repeated in the wake up preamble.

In Example 118, the subject matter of Examples 116-117 may include wherein the PN sequence is 15 bits.

In Example 119, the subject matter of Examples 116-118 may include further comprising oversampling the wake up packet about 16 times per bit to generate 16 samples per bit.

In Example 120, the subject matter of Example 119 may include further comprising averaging the 16 samples per bit.

In Example 121, the subject matter of Example 120 may include further comprising putting the PN sequence through a correlator.

In Example 122, the subject matter of Example 121 may include wherein the correlator is a 240-bit correlator.

In Example 123, the subject matter of Examples 120-121 may include delaying an output of the correlator and adding the output of the correlator back onto itself to produce an add and delay (AD) output.

In Example 124, the subject matter of Example 123 may include wherein the delay is about 240 cycles.

In Example 125, the subject matter of Examples 123-124 may include determining whether the wake up packet should be decoded by detecting a maximum of the AD output and comparing it to a predetermined value, wherein if the maximum of the AD output is higher than the predetermined value, decoding the wake up packet.

In Example 126, the subject matter of Example 125 may include detecting the maximum of the AD output using a rolling window, wherein the rolling window determines a local maximum of the AD output within its bounds and compares it to a previously determined maximum of the AD output.

In Example 127, the subject matter of Examples 125-126 may include setting the decoding threshold by using an on-off keying (OOK) demodulator.

In Example 128, the subject matter of Example 127 may include wherein the OOK demodulator is configured to set the decoding threshold by averaging a set of samples of the PN sequence.

In Example 129, the subject matter of Example 128 may include wherein the set of samples is two times the 16 samples of the 15-bit PN sequence.

In Example 130, the subject matter of Examples 128-129 may include wherein the set of samples is about 480 samples.

In Example 131, the subject matter of Examples 128-130 may include determining each decoded bit of the receiver ID, the payload, and the frame check sequence by comparing it to the decoding threshold.

In Example 132, the subject matter of Examples 116-131 may include matching the receiver ID to a communication device ID.

In Example 133, the subject matter of Examples 116-132 may include calculating a frame check from the receiver ID and the payload.

In Example 134, the subject matter of Examples 116-133 may include comparing the frame check to the FCS.

In Example 135, the subject matter of Examples 116-134 may include wherein the first receiver is a main receiver of the communication device.

In Example 136, the subject matter of Examples 116-135 may include wherein the second receiver is a low power receiver of the communication device.

In Example 137, the subject matter of Examples 136 may include wherein the low power receiver comprises a 14 nm complementary metal oxide semiconductor (CMOS).

In Example 138, a non-transitory computer readable medium with program instructions which when executed cause a processor in a first device to transmit a wake up packet to a second device, comprising: coding a wake up preamble portion of the wake up packet, wherein the wake up preamble comprises a repeated pseudorandom noise (PN) sequence; coding a data portion of the wake up packet, wherein the data portion comprises a receiver ID, a payload, and a frame check sequence; and transmitting the wake up packet to the second device.

In Example 139, the subject matter of Example 138 may include wherein the PN sequence is repeated two times.

In Example 140, the subject matter of Examples 138-139 may include further comprising coding the data portion of the wake up packet with an error correction.

In Example 141, the subject matter of Example 140 may include wherein the error correction comprises coding the data portion at about a 1-to-3 rate.

In Example 142, the subject matter of Example 138-141 may include further comprising coding the wake up preamble at about a 1-to-1 rate.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include a one or more components configured to perform each aspect of the related method.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims, and all changes within the meaning and range of equivalency of the claims are therefore intended to be embraced.

What is claimed is:

1. A communication device configured to power on a main receiver to receive data from a network comprising:
    a low power receiver configured to receive a wake up packet, comprising a preamble, from the network and oversample the wake up packet;
    a circuit arrangement comprising:
        a correlator configured to correlate the oversampled portion of the preamble;
        a delay and adder configured to take an output of the correlator, delay the output of the correlator, and add the output of the correlator back onto itself to produce a delay output;
        a peak detector configured to detect a peak pattern in the delay output;
        a demodulator configured to calculate a decoding threshold value to produce a demodulated data; and
        a packet parser configured to check the demodulated data for a data set in order to selectively output a nonzero signal to power on the main receiver.

2. The communication device of claim 1, wherein the wake up packet further comprises a receiver ID, a payload, and a frame check sequence.

3. The communication device of claim 1, the low power receiver further configured to oversample the wake up packet about 16 times to generate 16 samples per bit.

4. The communication device of claim 3, the circuit arrangement further configured to average the 16 samples of each of the bits of the wake up packet.

5. The communication device of claim 1, wherein the correlator is a 240-bit correlator.

6. The communication device of claim 1, wherein the delay and adder is configured to delay the output of the correlator by about 240 cycles.

7. The communication device of claim 1, wherein the peak detector is configured to detect the peak pattern after determining that the peak pattern has a value greater than a first threshold.

8. The communication device of claim 1, the peak detector further configured to determine the peak pattern by detecting the maximum of the AD output using a rolling window, wherein the rolling window determines a local maximum of the AD output within its bounds and compares it to a previously determined maximum of the AD output.

9. The communication device of claim 8, wherein the peak detector is configured to compare the maximum of the AD output to a second threshold value.

10. The communication device of claim 9, wherein the demodulator is further configured to demodulate the data if the maximum of the AD output is greater than the second threshold value.

11. The communication device of claim 1, wherein the data set comprises a receiver ID, wherein the packet parser is further configured to check if the receiver ID matches a communication device ID.

12. A circuit arrangement comprising:
   a correlator configured to correlate an oversampled portion of a preamble of a wake up packet;
   a delay and adder configured to take an output of the correlator, delay the output of the correlator, and add the output of the correlator back onto itself to produce a delay output;
   a peak detector configured to detect a peak pattern in the delay output;
   a demodulator configured to calculate a decoding threshold value to produce a demodulated data of the wake up packet; and
   a packet parser configured to check the demodulated data for a data set in order to selectively output a nonzero signal.

13. The circuit arrangement of claim 12, further comprising a receiving circuit which oversamples the wake up packet.

14. The circuit arrangement of claim 13, wherein the receiving circuit oversamples the wake up packet about 16 times to generate 16 samples per bit.

15. The circuit arrangement of claim 14, further comprising a sample averaging circuit configured to average the 16 samples of each of the bits of the wake up packet.

* * * * *